United States Patent
Luo et al.

(10) Patent No.: US 11,838,928 B2
(45) Date of Patent: Dec. 5, 2023

(54) DYNAMIC RESOURCE MANAGEMENT

(71) Applicant: QUALCOMM Incorporated, San Diego, CA (US)

(72) Inventors: Jianghong Luo, Skillman, NJ (US); Navid Abedini, Somerset, NJ (US); Muhammad Nazmul Islam, Littleton, MA (US); Luca Blessent, Whitehouse Station, NJ (US); Tao Luo, San Diego, CA (US); Junyi Li, Chester, NJ (US); Karl Georg Hampel, Hoboken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 16/671,138

(22) Filed: Oct. 31, 2019

(65) Prior Publication Data

US 2020/0145997 A1    May 7, 2020

Related U.S. Application Data

(60) Provisional application No. 62/755,250, filed on Nov. 2, 2018.

(51) Int. Cl.
*H04W 72/04* (2023.01)
*H04W 72/27* (2023.01)
(Continued)

(52) U.S. Cl.
CPC .............. *H04W 72/27* (2023.01); *H04L 5/26* (2013.01); *H04W 52/14* (2013.01);
(Continued)

(58) Field of Classification Search
CPC ............. H04W 72/0426; H04W 52/14; H04W 72/042; H04W 72/1284; H04W 72/1289;
(Continued)

(56) References Cited

U.S. PATENT DOCUMENTS 8,787,214 B2 * 7/2014 Gan ................... H04B 7/15557
                                                    370/277
9,055,576 B2    6/2015 Chen et al.
(Continued)

FOREIGN PATENT DOCUMENTS

CN        101982004 A    2/2011
CN        102301816 A    12/2011
(Continued)

OTHER PUBLICATIONS

AT&T: "Enhancements to Support NR Backhaul Links," 3GPP Draft, 3GPP TSG RAN WG1 Meeting #94bis, R1-1810690, 3rd Generation Partnership Project (3GPP), Mobile Competence Centre, 650, Route Des Lucioles, F-06921, Sophia-Antipolis Cedex, France, vol. RAN WG1, No. Chengudu, China, Oct. 8, 2018-Oct. 12, 2018, Sep. 29, 2018 (Sep. 29, 2018), XP051518094, 15 pages, Retrieved from the Internet: URL: http://www.3gpp.org/ftp/tsg_ran/WG1_RL1/TSGR1_94b/Docs/R1-1810690.zip [retrieved on Sep. 29, 2018] Chapter 2.3 "Frame Structure Design and Backhaul Multiplexing".
(Continued)

*Primary Examiner* — Hanh N Nguyen
(74) *Attorney, Agent, or Firm* — Holland & Hart LLP/Qualcomm Incorporated

(57) ABSTRACT

An access node may monitor for uplink and downlink resource release indications signaled by a parent access node and a child access node prior to scheduling a released resource. In some cases (e.g., when the child node is capable of half-duplex communications), the parent access node may determine to release a resource, and the child access node may determine to release a hard resource (e.g., a child node controlled resource). Receiving uplink and downlink resource release indications may enable the access node to schedule communication with the child node via a soft resource (e.g., a parent node controlled resource). Other
(Continued)

aspects of the described techniques are directed to feedback support for a slot format indicator (SFI). The feedback from the access node may accept or reject the SFI based on an impact the SFI has on scheduling via a child link established with a child node of the access node.

33 Claims, 18 Drawing Sheets

(51) Int. Cl.
*H04W 72/0446* (2023.01)
*H04L 5/26* (2006.01)
*H04W 52/14* (2009.01)
*H04W 84/04* (2009.01)
*H04W 88/04* (2009.01)
*H04W 72/21* (2023.01)
*H04W 72/23* (2023.01)

(52) U.S. Cl.
CPC ....... *H04W 72/0446* (2013.01); *H04W 72/21* (2023.01); *H04W 72/23* (2023.01); *H04W 84/047* (2013.01); *H04W 88/04* (2013.01)

(58) Field of Classification Search
CPC ............... H04W 84/047; H04W 88/04; H04W 72/0446; H04W 92/20; H04W 16/02; H04W 72/04; H04W 88/06; H04W 72/27; H04W 72/21; H04W 72/23; H04L 5/16; H04L 5/0055; H04L 5/0023; H04L 5/001; H04L 5/0091; H04L 5/0053; H04L 5/0048; H04L 5/26; H04B 7/155
See application file for complete search history.

(56) References Cited

U.S. PATENT DOCUMENTS

| | | | |
|---|---|---|---|
| 9,100,953 B2 | 8/2015 | Wu et al. | |
| 9,232,512 B2 | 1/2016 | Yu et al. | |
| 9,237,583 B2 | 1/2016 | Chen et al. | |
| 9,844,033 B2 | 12/2017 | Akyurek et al. | |
| 10,637,563 B2* | 4/2020 | Cui | H04W 4/90 |
| 10,841,070 B2* | 11/2020 | Smee | H04L 5/16 |
| 11,224,050 B2* | 1/2022 | Choi | H04W 88/184 |
| 2008/0080414 A1 | 4/2008 | Thubert et al. | |
| 2009/0040985 A1 | 2/2009 | Barnawi et al. | |
| 2010/0128630 A1 | 5/2010 | Barak et al. | |
| 2010/0150089 A1 | 6/2010 | Yu et al. | |
| 2015/0173086 A1 | 6/2015 | Karaman et al. | |
| 2017/0034850 A1 | 2/2017 | Rico Alvarino et al. | |
| 2018/0041979 A1 | 2/2018 | Hampel et al. | |
| 2018/0042031 A1 | 2/2018 | Hampel et al. | |
| 2018/0092139 A1 | 3/2018 | Novlan et al. | |
| 2018/0115990 A1 | 4/2018 | Abedini et al. | |
| 2018/0279348 A1 | 9/2018 | Huang et al. | |
| 2019/0014569 A1 | 1/2019 | Abedini et al. | |
| 2019/0021108 A1* | 1/2019 | Hampel | H04W 72/0426 |
| 2019/0123806 A1* | 4/2019 | Aryafar | H04L 5/14 |
| 2019/0132807 A1 | 5/2019 | Abedini et al. | |
| 2019/0239240 A1 | 8/2019 | Hampel et al. | |
| 2019/0246321 A1 | 8/2019 | Li et al. | |
| 2019/0306048 A1 | 10/2019 | Jadhav et al. | |
| 2019/0306846 A1 | 10/2019 | Luo et al. | |
| 2019/0313354 A1 | 10/2019 | Gupta et al. | |
| 2019/0349079 A1* | 11/2019 | Novlan | H04W 72/0446 |
| 2019/0394084 A1 | 12/2019 | Tsai et al. | |
| 2020/0145952 A1 | 5/2020 | Keskitalo et al. | |
| 2020/0145965 A1 | 5/2020 | Luo et al. | |
| 2020/0145967 A1* | 5/2020 | Park | H04W 72/27 |
| 2020/0145991 A1 | 5/2020 | Abedini et al. | |
| 2020/0145992 A1 | 5/2020 | Abedini et al. | |
| 2020/0145993 A1 | 5/2020 | Abedini et al. | |
| 2020/0145994 A1 | 5/2020 | Luo et al. | |
| 2020/0146099 A1 | 5/2020 | Abedini et al. | |
| 2020/0170010 A1 | 5/2020 | Luo et al. | |
| 2020/0260326 A1 | 8/2020 | Hashemi et al. | |
| 2021/0105698 A1 | 4/2021 | Jactat | |
| 2021/0160861 A1* | 5/2021 | You | H04W 84/04 |
| 2021/0259006 A1 | 8/2021 | Yoshioka et al. | |
| 2021/0320768 A1* | 10/2021 | Yuan | H04L 25/0224 |
| 2022/0086695 A1* | 3/2022 | Akl | H04L 41/0823 |

FOREIGN PATENT DOCUMENTS

| | | |
|---|---|---|
| WO | WO-2011140139 | 11/2011 |
| WO | WO-2018175817 A1 | 9/2018 |
| WO | WO2019105564 A1 | 6/2019 |
| WO | WO-2020102308 A1 | 5/2020 |

OTHER PUBLICATIONS

Ericsson: "Resource Allocation and Scheduling of IAB Networks," 3GPP Draft, 3GPP TSG-RAN WG1 Meeting #94bis, R1-1811513, 3rd Generation Partnership Project (3GPP), Mobile Competence Centre, 650, Route Des Lucioles, F-06921, Sophia-Antipolis Cedex, France, vol. RAN WG1, No. Chenguđu, China, Oct. 8, 2018-Oct. 12, 2018, Sep. 29, 2018, XP051518915, 11 pages, Retrieved from the Internet: URL:http://www.3gpp.org/ftp/tsg%5Fran/WG1%5FRL1/TSGR1%5F94b/Docs/R1%2D1811513%2Ezip [retrieved on Sep. 28, 2018] 2 Resource coordination limitations.
Ericsson: "Updated Summary of 7.2.3.1 Enhancements to Support NR Backhaul links," 3GPP TSG RAN WG1 Meeting #94bis, 3GPP Draft; R1-1812042, 3rd Generation Partnership Project (3GPP), Mobile Competence Centre, 650, Route Des Lucioles, F-06921, Sophia-Antipolis Cedex, France, vol. RAN WG1, No. Chenguđu, China, Oct. 8, 2018-Oct. 12, 2018, Oct. 12, 2018, XP051519366, Retrieved from the Internet: URL:http://www.3gpp.org/ftp/tsg%5Fran/WG1%5FRL1/TSGR1%5F94b/Docs/R1%2D1812042%2Ezip [retrieved on Oct. 12, 2018], pp. 3-4, Vivo, pp. 9-15, 3 Dynamic resouce allocation between backhaul and access links, 22 pages.
Huawei et al., "Physical Layer Design for NR IAB", 3GPP Draft; R1-1810130, 3rd Generation Partnership Project (3GPP), Mobile Competence Centre; 650, Route Des Lucioles; F-06921 Sophia-Antipolis Cedex; France, vol. RAN WG1, No. Chengdu, China; Oct. 8, 2018-Oct. 12, 2018 Sep. 29, 2018, XP051517545, Retrieved from the Internet: URL:http://www.3gpp.org/ftp/tsg%5Fran/WG1%5FRL1/TSGR1%5F94b/Docs/R1%2D1810130%2Ezip [retrieved on Sep. 29, 2018], 18 pages.
International Search Report and Written Opinion—PCT/US2019/059430—ISA/EPO—dated Feb. 7, 2020.
Nokia, et al., "Resource Allocation and Coordination for IAB", 3GPP TSG RAN WG2 Meeting #104, 3GPP Draft, R2-1817617_IAB_Resource Allocation V3, 3rd Generation Partnership Project (3GPP), Mobile Competence Centre, 650, Route Des Lucioles, F-06921 Sophia-Antipolis Cedex, France, vol. RAN WG2, No. Spokane, USA, Nov. 12, 2018-Nov. 16, 2018, Nov. 1, 2018, XP051481516, 7 pages, Retrieved from the Internet: URL:http://www.3gpp.org/ftp/tsg%5Fran/WG2%5FRL2/TSGR2%5F104/Docs/R2%2D1817617%2Ezip [retrieved on Nov. 1, 2018].
Qualcomm Incorporated: "IAB Resource Management", 3GPP Draft; R1-1809444, 3rd Generation Partnership Project (3GPP), Mobile Competence Centre ; 650, Route Des Lucioles; F-06921 Sophia-Antipolis Cedex; France, vol. RAN WG1, No. Gothenburg, Sweden; Aug. 20, 2018-Aug. 24, 2018, Aug. 17, 2018 (Aug. 17, 2018), 6 Pages, XP051517809, Retrieved from the Internet: URL: http://www.3gpp.org/ftp/tsg%5Fran/WG1%5FRL1/TSGR1%5F94/Docs/R1%2D1809444%2Ezip [retrieved on Aug. 17, 2018], pp. 2-5, 2.1 Baseline Approach: Semi-Static Resource Partitioning p. 5, 2.2 Enhanced Approach: Dynamic Resource Coordination Figures 2, 4, 5, Sections 2-3.
Qualcomm Incorporated: "Resource Coordination Across IAB Topology", 3GPP Draft; R2-1808007 Resource Coordination Across IAB Topology, 3rd Generation Partnership Project (3GPP), Mobile Competence Centre ; 650, Route Des Lucioles ; F-06921 Sophia-

(56) References Cited

OTHER PUBLICATIONS

Antipolis Cedex; Franc, vol. RAN WG2, No. Busan, South Korea; May 21, 2018-May 25, 2018, May 10, 2018 (May 10, 2018), XP051464245, 6 Pages, Retrieved from the Internet: URL:http://www.3gpp.org/ftp/tsg%5Fran/WG2%5FRL2/TSGR2%5F102/Docs [retrieved on May 10, 2018], p. 2.

Qualcomm Incorporated: "Resource Management in IAB Network," 3GPP Draft, 3GPP TSG RAN WG1 Meeting #94bis, R1-1811258, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051518661, 8 pages, Retrieved from the Internet: URL: http://www.3gpp.org/ftp/tsg%5Fran/WG1%5FRL1/TSGR1%5F94b/Docs/R1%2D1811258%2Ezip [retrieved on Sep. 29, 2018] Figures 1-5, Sections 2-3,Chapter 2.1 "Indication of Resource Partition Pattern", 2.2 Interaction between Resource Partition Pattern and Rel15 Resource Allocation, pp. 5-7, Chapter 2.3 "Dynamic Coordination with Extended SFI and UL Feedback", Chapter 2 "Conclusion".

Agiwal, M., et al. "Next Generation 5G Wireless Networks: A Comprehensive Survey," IEEE Communications Surveys & Tutorials, vol. 18, No. 3, pp. 1617-1655, third quarter 2016, doi: 10.1109/COMST.2016.2532458. (Year: 2016).

Gshosh A., et al., "5G Evolution: A View on 5G Cellular Technology Beyond 3GPP Release 15", Received Aug. 26, 2019, Accepted Sep. 1, 2019, Date of Publication Sep. 6, 2019, Date of Current Version Sep. 19, 2019, 13 Pages.

AT&T: "Architecture Considerations for L2 Relaying for IAB", 3GPP TSG-RAN WG3 #100, R3- 183194, Busan, Korea, May 21-25, 2018, pp. 1-5.

Ericsson: "Setup Procedures for IAB-Node and a UE Connected to an IAB Node", 3GPP TSG-RAN WG2 #102, R2-1806817, Busan, Republic of Korea, May 21-25, 2018, pp. 1-8.

Ericsson: "Summary of 7.2.3.1 Enhancements to Support NR Backhaul Links", 3GPP Draft, 3GPP TSG RAN WG1 Meeting #94bis, R1-1811844, 3rd Generation Partnership Project, Mobile Competence Centre, 650, Route Des Lucioles, F-06921 Sophia-Antipolis Cedex, France, vol. RAN WG1, No. Chengdu, China, Oct. 8, 2018-Oct. 12, 2018, Oct. 9, 2018, XP051519169, 21 pages, Chapter 3 "Dynamic Resource Allocation between Backhaul and Access Links".

Taiwan Search Report—TW108139742—TIPO—dated Jul. 26, 2023.

* cited by examiner

DYNAMIC RESOURCE MANAGEMENT

CROSS REFERENCE

The present Application for Patent claims the benefit of U.S. Provisional Patent Application No. 62/755,250 by LUO, et al., entitled "DYNAMIC RESOURCE MANAGEMENT," filed Nov. 2, 2018, assigned to the assignee hereof, and expressly incorporated herein. This application is related to U.S. application Ser. No. 16/671,073, entitled "DYNAMIC RESOURCE MANAGEMENT" and filed on Oct. 31, 2019 and Ser. No. 16/671,084, entitled "DYNAMIC RESOURCE MANAGEMENT" and filed Oct. 31, 2019.

BACKGROUND

The following relates generally to wireless communications, and more specifically to dynamic resource management.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communications systems may include access nodes to facilitate wireless communication between user equipment and a network. For example, an LTE or NR base station may provide a mobile device access to the internet via the wireless network. Access nodes typically have a high-capacity, wired, backhaul connection (e.g., fiber) to the network. In some deployments, however, it may be desirable to deploy a larger number of access nodes in a small area to provide acceptable coverage to users. In such deployments, it may be impractical to connect each access node to the network via a wired connection, and certain networks or portions thereof may be configured as integrated access and backhaul (IAB) networks where one or more access nodes have wireless backhaul connections to the network. Efficient deployment and operation of such access nodes with wireless backhaul connections may be desirable to enable efficient backhaul connections and enhance end user coverage.

SUMMARY

The described techniques relate to improved methods, systems, devices, or apparatuses, in accordance with dynamic resource management. Generally, the described techniques provide for improved resource management (e.g., in an integrated access and backhaul (IAB) network), feedback support for a slot format indicator (SFI) message, and resource pattern management for parent and child links in an IAB network. Network devices within a wireless communications system (e.g., within an integrated access and backhaul (IAB) network) may communicate according to some synchronized frame structure. Resources (e.g., corresponding to the synchronized frame structure) may be allocated to different wireless communication links to support relay of communications throughout the network. Techniques for improved resource management are shown and described.

In an example, an access node may respectively monitor for uplink and downlink resource release indications signaled by a parent access node and a child access node prior to scheduling a released resource. The parent access node may establish a first link with an access node, and the access node mode may establish a second link with a child access node. In some cases (e.g., when the child node is capable of half-duplex communications), the parent access node may determine to release a resource of the first link, and the child access node may determine to release a hard resource (e.g., a child node controlled resource) that is available (e.g., controllable or configurable) for the second link. Receiving uplink and downlink resource release indications may enable the access node to schedule communication with the child node via a soft resource (e.g., a parent node controlled resource) of the second link that is controlled by the parent node (e.g., a resource that must be approved or authorized by a parent node for use).

Other aspects of the described techniques are directed to feedback support for a slot format indicator (SFI). A parent access node may establish a first link with an access node, and may transmit, to the access node via the first link, downlink signaling indicating a SFI and a feedback request. The feedback request may solicit feedback from the access node and provide a mechanism by which the access node may accept or reject the SFI based on an impact the SFI has on scheduling a child link established with a child node of the access node. Subsequent to receiving the feedback request, the feedback message indicating acceptance or rejection of the indicated SFI.

Other aspects of the described techniques are directed to support for an uplink capability report indicating whether an access node has full or half duplex capability. A central unit that may be included in a parent access node of an access node or some other node, may receive a capability indicator that indicates a duplexing capability of the access node. The central unit may determine a first resource pattern for a parent link between the access node and a parent access node of the access node, and a second resource pattern for a second link between the access node and a child access node of the second access node based on the capability indicator. The central unit may, for example, align resource patterns of the parent and child links in accordance with the capabilities of the access node. In some examples, based on the determined resource patterns, the parent access node may communicate via the first link in accordance with the first resource pattern, and transmit an indicator of the second resource pattern to the second access node. The access node may then schedule communication with the child access node in accordance with the second resource pattern via resources of the child link.

A method of wireless communication by an access node is described. The method may include monitoring for a downlink indication indicating a resource release of a parent node controlled resource, where the resource release indicates availability of the parent node controlled resource for a link configured between the access node and a child access node, monitoring for an uplink indication indicating a resource release of a child access node controlled resource that is at least partially overlapping in time with the parent node controlled resource, where the resource release for the child access node controlled resource indicates availability of the child access node controlled resource for the link configured between the access node and the child access node, and scheduling the parent node controlled resource for the link configured between the access node and the child access node based on reception of both the downlink indication and the uplink indication.

An apparatus for wireless communication by an access node is described. The apparatus may include a processor, memory in electronic communication with the processor, and instructions stored in the memory. The instructions may be executable by the processor to cause the apparatus to monitor for a downlink indication indicating a resource release of a parent node controlled resource, where the resource release indicates availability of the parent node controlled resource for a link configured between the access node and a child access node, monitor for an uplink indication indicating a resource release of a child access node controlled resource that is at least partially overlapping in time with the parent node controlled resource, where the resource release of the child access node controlled resource indicates availability of the child access node controlled resource for the link configured between the access node and the child access node, and schedule the parent node controlled resource for the link configured between the access node and the child access node based on reception of both the downlink indication and the uplink indication.

Another apparatus for wireless communication by an access node is described. The apparatus may include means for monitoring for a downlink indication indicating a resource release of a parent node controlled resource, where the resource release indicates availability of the parent node controlled resource for a link configured between the access node and a child access node, monitor for an uplink indication indicating a resource release of a child access node controlled resource that is at least partially overlapping in time with the parent node controlled resource, where the resource release of the child access node controlled resource indicates availability of the child access node controlled resource for the link configured between the access node and the child access node, and scheduling the parent node controlled resource for the link configured between the access node and the child access node based on reception of both the downlink indication and the uplink indication.

A non-transitory computer-readable medium storing code for wireless communication by an access node is described. The code may include instructions executable by a processor to monitor for a downlink indication indicating a resource release of a parent node controlled resource, where the resource release indicates availability of the parent node controlled resource for a link configured between the access node and a child access node, monitor for an uplink indication indicating a resource release of a child access node controlled resource that is at least partially overlapping in time with the parent node controlled resource, where the resource release of the child access node controlled resource indicates availability of the child access node controlled resource for the link configured between the access node and the child access node, and schedule the parent node controlled resource for the link configured between the access node and the child access node based on reception of both the downlink indication and the uplink indication.

In some examples, the method, apparatuses, and non-transitory computer-readable medium described herein may include operations, features, means, or instructions for monitoring for a second downlink indication and a second uplink indication and determining that one or both of the second downlink indication and the second uplink indication may have not been received, and not scheduling the parent node controlled resource based on the determination that the one or both of the second downlink indication and the second uplink indication have not been received. In some examples the method, apparatuses, and non-transitory computer-readable medium described herein further may include operations, features, means, or instructions for receiving the downlink indication and the uplink indication, and scheduling the parent node controlled resource.

Some examples of the method, apparatuses, and non-transitory computer-readable medium described herein may further include operations, features, means, or instructions for scheduling a transmission with the child access node via the parent node controlled resource, and transmitting or receiving the transmission via the parent node controlled resource for the link based on the scheduling.

In some examples of the method, apparatuses, and non-transitory computer-readable medium described herein, monitoring for the downlink indication further may include operations, features, means, or instructions for monitoring for a physical downlink control channel message or a downlink medium access control message including the downlink indication. In some examples of the method, apparatuses, and non-transitory computer-readable medium described herein, monitoring for the uplink indication further may include operations, features, means, or instructions for monitoring for a physical uplink control channel message or an uplink medium access control message including the uplink indication.

In some examples of the method, apparatuses, and non-transitory computer-readable medium described herein, monitoring for the downlink indication further may include operations, features, means, or instructions for determining whether the downlink indication may be detected based on an on-off signaling scheme. In some examples of the method, apparatuses, and non-transitory computer-readable medium described herein, monitoring for the uplink indication further may include operations, features, means, or instructions for determining whether the uplink indication may be detected based on an on-off signaling scheme.

In some examples of the method, apparatuses, and non-transitory computer-readable medium described herein, monitoring for the downlink indication further may include operations, features, means, or instructions for identifying a multiplexing mode (e.g., where the multiplexing mode comprises a time division multiplexing (TDM) mode, a spatial division multiplexing (SDM) mode, or a frequency division multiplexing (FDM) mode) and monitoring for the downlink indication and the uplink indication based at least in part on the multiplexing mode.

In some examples of the method, apparatuses, and non-transitory computer-readable medium described herein, the downlink indication may include a message including a bit, field, or flag indicating the parent node controlled resource.

In some examples of the method, apparatus, and non-transitory computer readable medium described herein, the uplink indication comprises a message including a bit, field, or flag indicating the child access node controlled resource.

A method of wireless communication by an access node is described. The method may include receiving, from a parent access node, downlink signaling indicating a slot format and a feedback request, determining, based the indicated slot format, an impact on scheduling for a link configured between the access node and a child access node of the access node, and, responsive to the feedback request, transmitting a feedback message indicating acceptance or rejection of the indicated slot format based on the impact on scheduling.

An apparatus for wireless communication by an access node is described. The apparatus may include a processor, memory in electronic communication with the processor, and instructions stored in the memory. The instructions may be executable by the processor to cause the apparatus to receive, from a parent access node, downlink signaling indicating a slot format and a feedback request, determine, based on the indicated slot format, an impact on scheduling for a link configured between the access node and a child access node of the access node, and transmit a feedback message indicating acceptance or rejection of the indicated slot format based on the feedback request.

Another apparatus for wireless communication by an access node is described. The apparatus may include means for receiving, from a parent access node, downlink signaling indicating a slot format and a feedback request, determining, based on indicated slot format, an impact on scheduling for a link configured between the access node and a child access node of the access node, and transmitting a feedback message indicating acceptance or rejection of the indicated slot format based on the feedback request.

A non-transitory computer-readable medium storing code for wireless communication by an access node is described. The code may include instructions executable by a processor to receive, from a parent access node, downlink signaling indicating a slot format and a feedback request, determine, based on the indicated slot format, an impact on scheduling for a link configured between the access node and a child access node of the access node, and transmit a feedback message indicating acceptance or rejection of the indicated slot format based on the feedback request.

In some examples of the method, apparatuses, and non-transitory computer-readable medium described herein, receiving the downlink signaling further may include operations, features, means, or instructions for receiving the downlink signaling indicating that a resource previously indicated to be non-schedulable may be now schedulable. In some examples of the method, apparatuses, and non-transitory computer-readable medium described herein, receiving the downlink signaling further may include operations, features, means, or instructions for receiving the downlink signaling indicating availability of a parent-node controlled resource of a link configured between the parent access node and the access node.

In some examples of the method, apparatuses, and non-transitory computer-readable medium described herein, transmitting the feedback message further may include operations, features, means, or instructions for transmitting a physical uplink control channel message or an uplink medium access control message indicating acceptance or rejection of the indicated slot format. In some examples of the method, apparatuses, and non-transitory computer-readable medium described herein, transmitting the feedback message further may include operations, features, means, or instructions for transmitting the feedback message indicating acceptance or rejection of a portion of a set of one or more slots corresponding to the indicated slot format. In some examples of the method, apparatuses, and non-transitory computer-readable medium described herein, the feedback request may be a field having a defined value indicated by the downlink signaling.

In some examples of the method, apparatuses, and non-transitory computer-readable medium described herein, transmitting the feedback message further may include operations, features, means, or instructions for transmitting the feedback message including a single bit indicating acceptance or rejection of the slot format. In some examples of the method, apparatuses, and non-transitory computer-readable medium described herein, transmitting the feedback message further may include operations, features, means, or instructions for transmitting the feedback message indicating a request to use a parent-controlled resource of the link to accept the indicated slot format based at least in part on the impact on scheduling. In some examples of the method, apparatuses, and non-transitory computer-readable medium described herein, transmitting the feedback message further may include operations, features, means, or instructions for transmitting the feedback message declining to use a parent-controlled resource of the link to reject the indicated slot format based at least in part on the impact on scheduling.

In some examples of the method, apparatuses, and non-transitory computer-readable medium described herein, transmitting the feedback message further may include operations, features, means, or instructions for transmitting the feedback message indicating that a child-controlled resource of the link may be unscheduled to accept the indicated slot format based at least in part on the impact on scheduling. In some examples of the method, apparatuses, and non-transitory computer-readable medium described herein, transmitting the feedback message further may include operations, features, means, or instructions for transmitting the feedback message indicating that a child-controlled resource of the link may be scheduled to reject the indicated slot format based at least in part on the impact on scheduling.

A method of wireless communication by a first access node is described. The method may include receiving a capability indicator from a second access node, determining a first resource pattern for a first link between the second access node and the access node and determining a second resource pattern for a second link between the second access node and a child access node of the second access node based on the capability indicator, communicating via the first link in accordance with the first resource pattern, and transmitting an indicator of the second resource pattern to the second access node.

An apparatus for wireless communication by a first access node is described. The apparatus may include a processor, memory in electronic communication with the processor, and instructions stored in the memory. The instructions may be executable by the processor to cause the apparatus to receive a capability indicator from a second access node, determine a first resource pattern for a first link between the second access node and the access node and determining a second resource pattern for a second link between the second access node and a child access node of the second access node based on the capability indicator, communicate via the first link in accordance with the first resource pattern, and transmit an indicator of the second resource pattern to the second access node.

Another apparatus for wireless communication by a first access node is described. The apparatus may include means for receiving a capability indicator from a second access node, determining a first resource pattern for a first link between the second access node and the access node and determining a second resource pattern for a second link between the second access node and a child access node of the second access node based on the capability indicator, communicating via the first link in accordance with the first resource pattern, and transmitting an indicator of the second resource pattern to the second access node.

A non-transitory computer-readable medium storing code for wireless communication by a first access node is described. The code may include instructions executable by a processor to receive a capability indicator from a second access node, determine a first resource pattern for a first link between the second access node and the access node and determine a second resource pattern for a second link between the second access node and a child access node of the second access node based on the capability indicator, communicate via the first link in accordance with the first resource pattern, and transmit an indicator of the second resource pattern to the second access node.

In some examples of the method, apparatuses, and non-transitory computer-readable medium described herein, the first access node may be a parent access node of the second access node. In some examples of the method, apparatuses, and non-transitory computer-readable medium described herein, the first access node may be a central unit. Some examples of the method, apparatuses, and non-transitory computer-readable medium described herein may further include operations, features, means, or instructions for configuring the first resource pattern and the second resource pattern to support a time division multiplexing scheme between the first link and the second link based on the capability indicator indicating that the second access node may have a half-duplex capability.

Some examples of the method, apparatuses, and non-transitory computer-readable medium described herein may further include operations, features, means, or instructions for configuring the first resource pattern and the second resource pattern to support a spatial division multiplexing scheme or a frequency division multiplexing scheme with uplink and downlink coordination between the first link and the second link based on the capability indicator indicating that the second access node may have a half-duplex capability. In some examples of the method, apparatuses, and non-transitory computer-readable medium described herein, configuring the first resource pattern and the second resource pattern may include operations, features, means, or instructions for configuring the first resource pattern and the second resource pattern to coordinate a transmit state and receive state for the first and second links.

In some examples of the method, apparatuses, and non-transitory computer-readable medium described herein, configuring the first resource pattern and the second resource pattern further may include operations, features, means, or instructions for configuring the first resource pattern and the second resource pattern to configure the second access node to simultaneously be in a transmit state for the first and second links. In some examples of the method, apparatuses, and non-transitory computer-readable medium described herein, configuring the first resource pattern and the second resource pattern further may include operations, features, means, or instructions for configuring the first resource pattern and the second resource pattern to configure the second access node to simultaneously be in a receive state for the first and second links.

DETAILED DESCRIPTION

Figure 1:
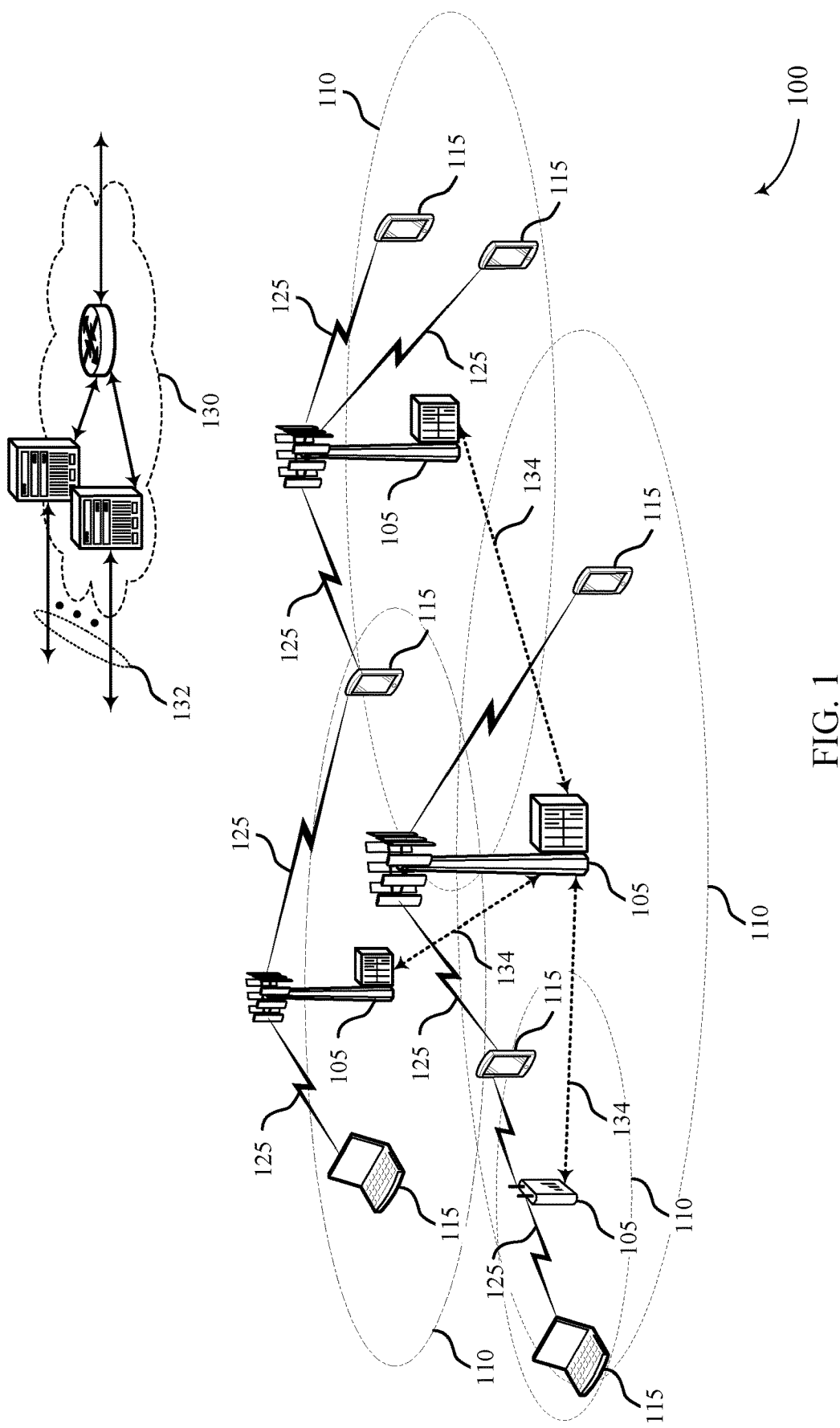
FIG. 1 illustrates an example of a system for wireless communications that supports dynamic resource management in accordance with aspects of the present disclosure.

In some wireless communications systems it may be desirable to deploy a large number of network devices (e.g., access nodes) in a small area to provide acceptable coverage to users. In such deployments, it may be impractical to connect each access node to the network via a wired connection. Therefore, some communications systems (e.g., 5G new radio (NR) systems) may include infrastructure and spectral resources for wireless network access that additionally supports wireless backhaul link capabilities in supplement to wireline backhaul connections (e.g., providing an integrated access and backhaul (IAB) network architecture). Such systems may support both wireless access traffic (e.g., between network devices and UEs) and backhaul traffic (e.g., traffic between separate network devices). For example, network devices may support an IAB network (e.g., a self-backhauling network), where the network may share time and frequency resources between access traffic and backhaul traffic. In some cases, the IAB network may be implemented for millimeter-wave (mmW) systems (e.g., with narrow beams through beamforming techniques) to minimize interference (e.g., inter-link interference) between the different transmissions. Accordingly, the IAB network may enhance link capacity, reduce latency, and reduce cell deployment cost within the wireless communications system.

For example, an IAB network architecture may include a chain of connected wireless devices (e.g., starting with a donor network device connected to the core network and ending with a UE, with any number of relay network devices in between). Wireless devices may be connected via link resources that support network access (e.g., NR access) and backhaul capabilities (e.g., a wireline backhaul or wireless backhaul). A relay network device may refer to an intermediary node in a relay chain (e.g., an intermediary node in an IAB relay chain). For example, a relay network device may relay communications between a parent network device (e.g., an IAB donor, or an IAB node upstream or higher on the relay chain) and a child network device (e.g., an IAB node downstream or lower on the relay chain). Thus, a relay network device may have an established communication link with a parent node (e.g., an established parent link for backhaul communications) as well as an established communication link with each child node (e.g., one or more established child links). While various examples provided herein describe IAB networks, the described techniques for improved resource, feedback support for slot format indicator (SFI) message, and resource pattern management for parent and child links in an IAB network may be generally applied to any type of wireless network.

In some wireless communications systems, such as IAB networks, some network devices may operate under a half-duplex constraint (e.g., where a network device may not transmit and receive, or communicate over both a parent link and a child link, at the same time). In some scenarios, parent node needs and child node needs of a network device may conflict (e.g., a parent node and a child node may wish to communicate with a network device at the same time). To accommodate communications on both a parent link and child link, a network device may employ time division multiplexing (TDM) of parent link and child link resources. Note that a network device serves as a scheduler over its child link (the link between the network device and its child node). For each network device, a time resource may be associated with a resource type, which defines the usage of this resource by this network device over its child link. Resource types may include hard, soft, not available (NA). A hard resource of a device refers to a resource that is available (e.g. controlled or configurable) by this device over its child link. A soft resource of a particular device may refer to a resource that is controlled by the parent node of the particular device (e.g., a resource that must be approved or authorized by a parent node of the particular device for use). Therefore, a soft resource of the particular device may also be referred to as a parent node controlled resource according to aspects described herein. A NA resource of the particular device may refer to a resource that may not be used by the device over a child link.

Conventional techniques for resource management (e.g., resource assignment, resource type updating, etc.) may, in some cases, result in inefficient use of system resources. For example, in scenarios where a network device is assigned with a hard or soft resource, if the same resource is assigned as hard type at the child node of this network device, a conflict may occur between the network device and its child node for use of the resource due to lack of coordination signal between the devices. Using uplink indications, the devices may avoid such conflicts.

In an example, an access node may respectively monitor for uplink and downlink resource release indications signaled by a parent access node and a child access node prior to scheduling a released resource. The parent access node may establish a first link with an access node, and the access node mode may establish a second link with a child access node. In some cases, the parent access node may determine to release a resource of the first link, and the child access node may determine to release a hard resource (e.g., a child node controlled resource) that is available (e.g., controllable or configurable) for the second link. In some cases, the resource released by the parent node and the resource released by the child node may at least partially overlap in time (e.g., some or all of the released resources may correspond to the same time). Receiving uplink and downlink resource release indications may enable the access node to schedule communication with the child node via a soft resource (e.g., a parent node controlled resource) of the second link that is controlled by the parent node (e.g., a resource that must be approved or authorized by a parent node for use).

Other aspects of the described techniques are directed to feedback support for a slot format indicator (SFI). A parent access node may establish a first link with an access node, and may transmit, to the access node via the first link, downlink signaling indicating a SFI and a feedback request. The feedback request may solicit feedback from the access node and provide a mechanism by which the access node may accept or reject the SFI based on an impact the SFI has on scheduling via a child link established with a child node of the access node. Subsequent to receiving the feedback request, the feedback message may indicate acceptance or rejection of the indicated SFI.

Other aspects of the described techniques are directed to support for an uplink capability report indicating whether an access node has full or half duplex capability. A central unit that may be included in a parent access node of an access node or some other node, may receive a capability indicator that indicates a duplexing capability of the access node. The central unit may determine a first resource pattern for a parent link between the access node and a parent access node of the access node, and a second resource pattern for a second link between the access node and a child access node of the second access node based on the capability indicator. The central unit may, for example, align resource patterns of the parent and child links in accordance with the capabilities of the access node. In some examples, based on the determined resource patterns, the parent access node may communicate via the first link in accordance with the first resource pattern, and transmit an indicator of the second resource pattern to the second access node. The access node may then schedule communication with the child access node in accordance with the second resource pattern via resources of the child link.

Particular aspects of the subject matter described herein may be implemented to realized one or more advantages. The described techniques may support improvements in resource allocation in IAB networks, which may decrease signaling overhead and improve reliability, among other advantages. As such, techniques may include improved network operations and, in some example, may promote network efficiencies, among other benefits.

Aspects of the disclosure are initially described in the context of a wireless communications system. Example wireless communications systems, IAB chains, signaling, and process flows implementing the discussed techniques are then described. Aspects of the disclosure are further illustrated by and described with reference to apparatus diagrams, system diagrams, and flowcharts that relate to dynamic resource management.

FIG. 1 illustrates an example of a wireless communications system 100 that supports a dynamic resource management in accordance with one or more aspects of the present disclosure. The wireless communications system 100 includes network devices 105 (e.g., access nodes or base stations), UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. Wireless communications system 100 may support dynamic resource management techniques described herein (e.g., such as enhanced SFI, uplink full/half duplex capability reporting, uplink or child node resource release, etc.).

Network devices 105 may wirelessly communicate with UEs 115 via one or more network device antennas. Network devices 105 described herein may include or may be referred to by those skilled in the art as a base station, a base transceiver station, a radio base station, an access point, a network node, an access node, an IAB node, a wireless node, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include network devices 105 of different types (e.g., macro or small cell base stations, donor network devices including a central unit (CU) connected to the core network 130, relay network devices including mobile-termination (MT) functionality and distributed unit (DU) functionality, etc.). The UEs 115 described herein may be able to communicate with various types of network devices 105 and network equipment including macro eNBs, small cell eNBs, gNBs, relay base stations, and the like.

Each network device 105 may be associated with a particular geographic coverage area 110 in which communications with various UEs 115 is supported. Each network device 105 may provide communication coverage for a respective geographic coverage area 110 via communication links 125, and communication links 125 between a network device 105 and a UE 115 may utilize one or more carriers. Communication links 125 shown in wireless communications system 100 may include uplink transmissions from a UE 115 to a network device 105, or downlink transmissions from a network device 105 to a UE 115. Downlink transmissions may also be called forward link transmissions while uplink transmissions may also be called reverse link transmissions.

The geographic coverage area 110 for a network device 105 may be divided into sectors making up only a portion of the geographic coverage area 110, and each sector may be associated with a cell. For example, each network device 105 may provide communication coverage for a macro cell, a small cell, a hot spot, or other types of cells, or various combinations thereof. In some examples, a network device 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same network device 105 or by different network devices 105. The wireless communications system 100 may include, for example, a heterogeneous LTE/LTE-A/LTE-A Pro or NR network in which different types of network devices 105 provide coverage for various geographic coverage areas 110.

The term "cell" refers to a logical communication entity used for communication with a network device 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a network device 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a network device 105. Other UEs 115 in such a group may be outside the geographic coverage area 110 of a network device 105, or be otherwise unable to receive transmissions from a network device 105. In some cases, groups of UEs 115 communicating via D2D communications may utilize a one-to-many (1:M) system in which each UE 115 transmits to every other UE 115 in the group. In some cases, a network device 105 facilitates the scheduling of resources for D2D communications. In other cases, D2D communications are carried out between UEs 115 without the involvement of a network device 105.

Network devices 105 may communicate with the core network 130 and with one another. For example, network devices 105 may interface with the core network 130 through backhaul links 132 (e.g., via an S1, N2, N3, NG, or other interface). Network devices 105 may communicate with one another over backhaul links 134 (e.g., via an X2, Xn, or other interface, such as a wireless interface) either directly (e.g., directly between network devices 105) or indirectly (e.g., via core network 130).

Network devices 105 may support functionality for IAB network operation. For example, network devices 105 may be split into support entities (e.g., functionalities) for promoting wireless backhaul density in collaboration with NR communication access. In some cases, a network device 105 (e.g., a donor network device or donor IAB node) may be split into associated CU and DU entities, where one or more DUs may be partially controlled by an associated CU. The CU entity of the network device 105 may facilitate connection between the core network 130 and the network device (e.g., access node), for example, via a wireline or wireless connection to the core network 130. The one or more DUs of the network device 105 may control and/or schedule functionality for additional devices (e.g., one or more alternative network devices 105 and/or UEs 115) according to configured access and backhaul links. Based on supported CU and DU entities at a network device 105, such a network device 105 may be referred to as a donor base station (e.g., or IAB donor).

Additionally, in some cases, a network device 105 may be split into associated MT and base station DU entities, where MT functionality of the network device 105 may be controlled and/or scheduled by the DU entities of the one or more donor base stations (e.g., via a Uu interface). DUs associated with such a network device 105 may be controlled by MT functionality. In addition, DUs of the network device 105 may be partially controlled by signaling messages from CU entities of associated donor network devices (e.g., donor access nodes) on the configured access and backhaul links of a network connection (e.g., via an F1-application protocol (AP)). The DUs of the one or more network devices 105 may support one of multiple serving cells 110 of the network coverage area. The DUs of the one or more network devices 105 may control and/or schedule functionality for additional devices (e.g., one or more alternative network devices 105, UEs 115) according to configured access and backhaul links. Based on supported MT and DU entities at a network device 105, such a network device may be referred to as an intermediary access node (e.g., or IAB relay node).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by network devices 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

In some cases, at least some of the network devices, such as a network device 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or network device 105 may be distributed across various network devices (e.g., radio heads and access network controllers) or consolidated into a single network device (e.g., a network device 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and network devices 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as network devices 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, network device 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a network device 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a network device 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a network device 105 may use multiple antennas or antenna arrays to conduct beamforming operations for directional communications with a UE 115. For instance, some signals (e.g. synchronization signals, reference signals, beam selection signals, or other control signals) may be transmitted by a network device 105 multiple times in different directions, which may include a signal being transmitted according to different beamforming weight sets associated with different directions of transmission. Transmissions in different beam directions may be used to identify (e.g., by the network device 105 or a receiving device, such as a UE 115) a beam direction for subsequent transmission and/or reception by the network device 105. Some signals, such as data signals associated with a particular receiving device, may be transmitted by a network device 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the network device 105 in different directions, and the UE 115 may report to the network device 105 an indication of the signal it received with a highest signal quality, or an otherwise acceptable signal quality. Although these techniques are described with reference to signals transmitted in one or more directions by a network device 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the network device 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a network device 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a network device 105 may be located in diverse geographic locations. A network device 105 may have an antenna array with a number of rows and columns of antenna ports that the network device 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a network device 105 or core network 130 supporting radio bearers for user plane data. At the Physical (PHY) layer, transport channels may be mapped to physical channels.

In some cases, UEs 115 and network devices 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a network device 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., network devices 105 or UEs 115) may have a hardware configuration that supports communications over a particular carrier bandwidth, or may be configurable to support communications over one of a set of carrier bandwidths. In some examples, the wireless communications system 100 may include network devices 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or network device 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

As discussed above, in wireless communications system 100, one or more network devices 105 (e.g., donor network devices 105, a donor IAB nodes, etc.) may include CUs and DUs, where one or more DUs associated with a donor base station may be partially controlled by a CU associated with the donor base station. A CU may be a component of a network management function, database, data center, or core network 130 (e.g., a 5G NR core network (5GC)). A CU may communicate with core network 130 via a backhaul link 132 (e.g., a wireline backhaul or a wireless backhaul). In IAB networks, a CU (e.g., a donor network device 105) may communicate with the core network 130 (e.g., the 5GC) via a backhaul link 132 (e.g., a wireline backhaul or wireless backhaul). The donor network device 105 may be referred to, for example in an IAB network, as an IAB donor and may be in communication with one or more IAB nodes (e.g., other network devices 105) operating as DUs relative to the IAB donor and one or more UEs. For example, an IAB network may include a chain of wireless devices (e.g., starting with the donor network device 105, a radio access network (RAN) node that terminates an interface with the core network, and ending with a UE 115, with any number of IAB nodes or relay base stations in between).

Intermediary or relay network devices (e.g., IAB nodes, relay base stations, relay nodes, etc.) may support MT functionality (which may also be referred to as UE function (UE-F)) controlled and scheduled by an IAB donor, or another parent network device. Such network devices (e.g., relay base stations, relay nodes, etc.) may also support DU functionality (which may also be referred to as an access node function (AN-F)) relative to additional entities (e.g., IAB nodes, UEs, etc.) within the relay chain or configuration of the access network (e.g., downstream). In some cases, MT functionality may refer to an implementation that supports at least some aspects of a MT or a UE (e.g., as defined by 3GPP TS 23.101 version 8.0.0 Release 8). These relay mechanisms may forward traffic along to the additional entities, extend the range of wireless access for one or more base stations, enhance the density of backhaul capability within serving cells 110, etc.

In some examples, wireless communications system 100 may employ one or more wired and wireless backhaul links (e.g., backhaul link 132 or backhaul link 134) for establishing connectivity between a core network (e.g., core network 130) and the one or more wireless nodes within wireless communications system 100. For example, wireless communications system 100 may include multiple network devices 105 (e.g., base stations, remote radio heads, etc.), where at least one network device 105 is coupled to a wireline backhaul link, such as an optical fiber cable. Additional network devices 105 may not be directly coupled to the core network 130 or to another network devices 105 via a wired backhaul link, and may use wireless backhaul links to communicate backhaul traffic. In such cases, the network devices 105 may wirelessly communicate backhaul access traffic to a high-capacity fiber point (e.g., a location where a network device is coupled with a wireline link to core network 130). Each of the backhaul links 132 and 134 may carry packets from the one or more established PDN gateways through the SGi interface and subsequently direct the packets through the core network and to the coupled wireless nodes over the S1 interface.

While mobile access may sometimes be associated with single-hop communication links between a source and destination (e.g., an asymmetric link), wireless backhaul communications may support multi-hop transport and provide robustness through topological redundancy (e.g., alternative paths for data exchange within a wireless communications network). Accordingly, underlying links using wireless backhaul communications may be symmetric in nature and use large-scale resource coordination among the wireless communication links.

Figure 2:
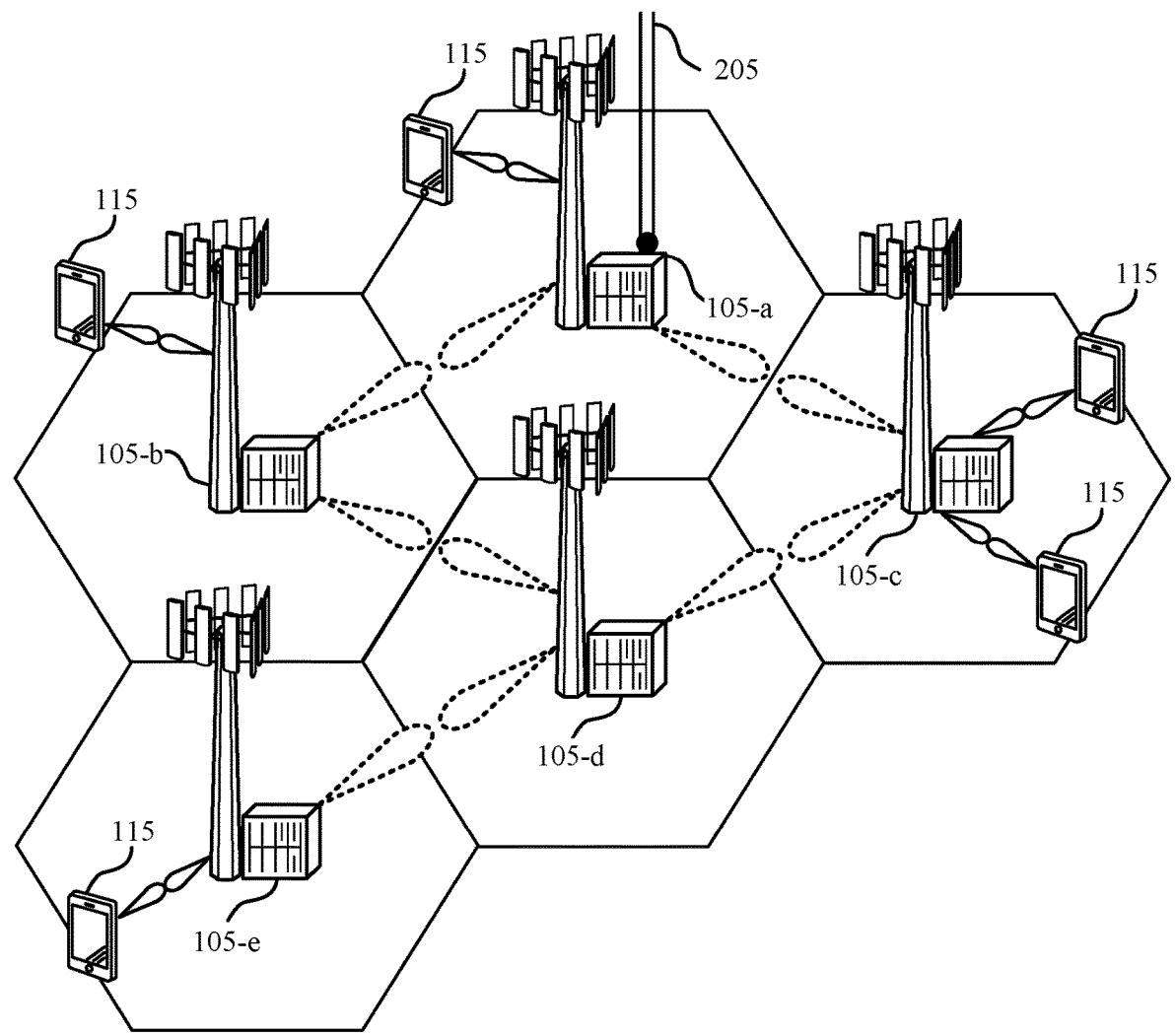
FIG. 2 illustrates an example of a wireless communications system that supports dynamic resource management in accordance with aspects of the present disclosure.

FIG. 2 illustrates an example of a wireless communications system 200 that supports aspects of dynamic resource management in accordance with one or more aspects of the present disclosure. In some examples, wireless communications system 200 may implement aspects of wireless communications system 100. Wireless communications system 200 may support one or more network devices 105 supporting network access to one or more UEs 115 within cell coverage areas 110. Infrastructure and spectral resources for network access within wireless communications system 200 may additionally support wireless backhaul link 215 capabilities in supplement to wireline backhaul connections 205, providing an IAB network architecture. Aspects of the supporting functionalities of the network devices 105 may be referred to as IAB nodes. For example, FIG. 2 illustrates a wireless communications system 200 (e.g., an NR system) that may implement the IAB architecture by connecting one access node (e.g., network device 105-a) in the wireless communications system 200 to the core network 130 via a fiber point backhaul connection 205, while other network devices 105 in the wireless communications system 200 (e.g., network device 105-b, network device 105-c, network device 105-d, and network device 105-e) may exchange access traffic with the fiber point backhaul connection 205 via the wireless backhaul network, using wireless backhaul links 215 (e.g., using beamformed wireless backhaul connections). Each network device 105 may then communicate the access traffic with the one or more UEs 115 that it serves over the access network, using access links 210 (e.g., using beamformed wireless access connections).

In wireless communications systems that employ wireline links for backhaul communications, a wireless node may enjoy a robust wireline link to a network entity that coordinates aspects of backhaul communications (e.g., the network entity provides timing information, cell identity, etc.) for neighboring nodes to coordinate backhaul transmissions. However, in some systems, deploying a wireline link to wireless nodes may result in substantial expense and resource expenditure. For example, wireless nodes operating in mmW frequency ranges may be associated with a reduced coverage area (e.g., a smaller geographic footprint, directional transmissions, etc.), which may result in a deployment of a larger number of access nodes (e.g., network devices 105 or IAB nodes) to provide acceptable coverage areas to users. As a result, a number of network devices 105 within the wireless communication system may not be coupled with a wireline backhaul link and may instead use wireless backhaul links 215 for backhaul communications in a wireless backhaul network.

In some cases, network device 105-a may be split into associated base station CU and DU entities (as described with respect to FIG. 3), where one or more DUs may be partially controlled by an associated CU. The CU entity of the network device 105-a may facilitate connection between the core network 130 and the network device 105-a (e.g., via a wireline backhaul connection 205 or, in some cases, a wireless connection to the core network). The DUs of the network device 105-a may control and/or schedule functionality for additional devices (e.g., relay base stations or relay IAB nodes, such as network device 105-b, network device 105-c, and UEs 115) according to configured wireless backhaul links 215 and wireless access links 210. Based on the supported entities at the network device 105-a (e.g., such as the CU entity), the network device 105-a may be referred to as an IAB donor.

A relay network device (e.g., network device 105-b and network device 105-c) may support link connectivity with the IAB donor (e.g., network device 105-a) as part of a relay chain within the IAB network architecture. For example, network device 105-b may be split into associated MT and DU entities (as described with respect to FIG. 3), where MT functionality of the base station 105-b may be controlled and/or scheduled by a DU entity of network device 105-a. DUs associated with network device 105-b may be controlled by MT functionality of the network device 105-b. In addition, in some cases, one or more DUs of the network device 105-b may be partially controlled by signaling messages from CU entities of associated IAB donor nodes (e.g., a CU of network device 105-a) of the network connection (e.g., via an F1-application protocol (AP)). The DU of the network device 105-b may support a serving cell 110 of the IAB network coverage area, and may provide for communications with one or more UEs 115 via access links 210. Based on the supported entities at the network device 105-b, the network device 105-b may be referred to as a relay network device, an IAB node, a relay node, etc.

A network device 105 (e.g., a relay network device) may thus be configured for access network functionality (ANF) and UE functionality (UEF) to allow the network device 105 to act as a scheduling entity and a receiving (e.g., scheduled) entity. Each of the functionalities may be operated via the one or more backhaul links 215. ANF functionality may enable network devices 105 to operate as a scheduling entity over one or more access links 210, and communicate with one or more UEs 115 located within the IAB network. ANF functionality may further enable network devices 105 to operate as a scheduling entity over one or more coupled backhaul links 215, to facilitate communication between the one or more other network devices 105 of the IAB network (i.e., via the mesh topology). UEF functionality may enable network devices 105 to operate as a scheduled entity and communicate with one or more other network devices 105 to receive data. In some cases, a network device 105 may include a routing table for examining a received data packet and forwarding the packet along the best path of the IAB network toward the specified IP address of the packet's destination. In some cases, each relay network device 105 may be associated with a single MT function, and may thus employ backhaul relaying as shown. In some cases, relay base stations 105 may support multiple MT functions, in which case relay base stations 105 may be capable of multi-connected cellular backhaul.

Wireless communications system 200 may employ one or more wireless access links 210 for establishing mobile access to one or more coupled UEs 115. Each of the network devices 105 and the UEs 115 may be configured to support cellular radio access technologies (RATs), such as mmW-based RATs, for access traffic between the UEs 115 and the network devices 105. Moreover, each of network devices 105 may share resources of the configured RATs for access traffic with backhaul traffic over the network (e.g., as in the case of IAB). IAB network solutions may be increasingly beneficial with the evolution of cellular technologies due to enhancements in wireless link capacity. Specifically, IAB network solutions may provide solutions to densification of network cells (i.e., cost reduction of small cell deployments) and increases in data traffic, as a means to maximize spectrum efficiency through joint optimization and integration of access and backhaul resources within the network.

For example, IAB network solutions may be suitable for mmW RATs due to a large bandwidth per channel and the need to mitigate short term signal blocking.

An access link using a mmW-based radio access technology (RAT) may be designed as an asymmetric single-hop link, which may be used for assigning control and scheduling tasks to a network device 105 while providing instruction to one or more UEs 115 for scheduling communication. In such cases, a network device 105 may coordinate wireless resources among multiple UEs 115, while each UE 115 may be assigned to one or more network devices 105. In some cases, inter-node links may be symmetric in nature and may form mesh topologies for enhanced robustness, where wireless transport may occur along multiple hops. The combination of the UEF and ANF capability at a network device 105 of the IAB network may allow the network device 105 to utilize switching operations over the wireless spectrum associated with the RAT, to transmit access traffic to/from UEs 115 and backhaul traffic to/from core network 130 (e.g., via backhaul links 215 to network device 105-a) providing coupled access to the one or more PDNs.

Using the techniques described herein, wireless communications system 200 may coordinate and configure wireless resources (e.g., for access traffic and backhaul traffic) and efficiently handle any system constraints (e.g., half-duplexed communications, inter-link interference, etc.). For instance, inter-link interference may be managed using spatial division multiple access (SDMA) techniques (e.g., through the use of narrow beams), and inter-node beam coordination may account for any remaining interference. Further, wireless communications system 200 may support uplink and downlink resource release indications (e.g., signaled by a parent access node and a child access node prior to scheduling a released resource). Other aspects of the described techniques are directed to feedback support for SFI (e.g., such that a network device may accept or reject the SFI, from a parent node, based on an impact the SFI has on scheduling via a child link of the network device). For example, network device 105-a may be considered a parent node, network device 105-b may be considered an access or relay node, and network device 105-d may be considered a child node.

Figure 3:
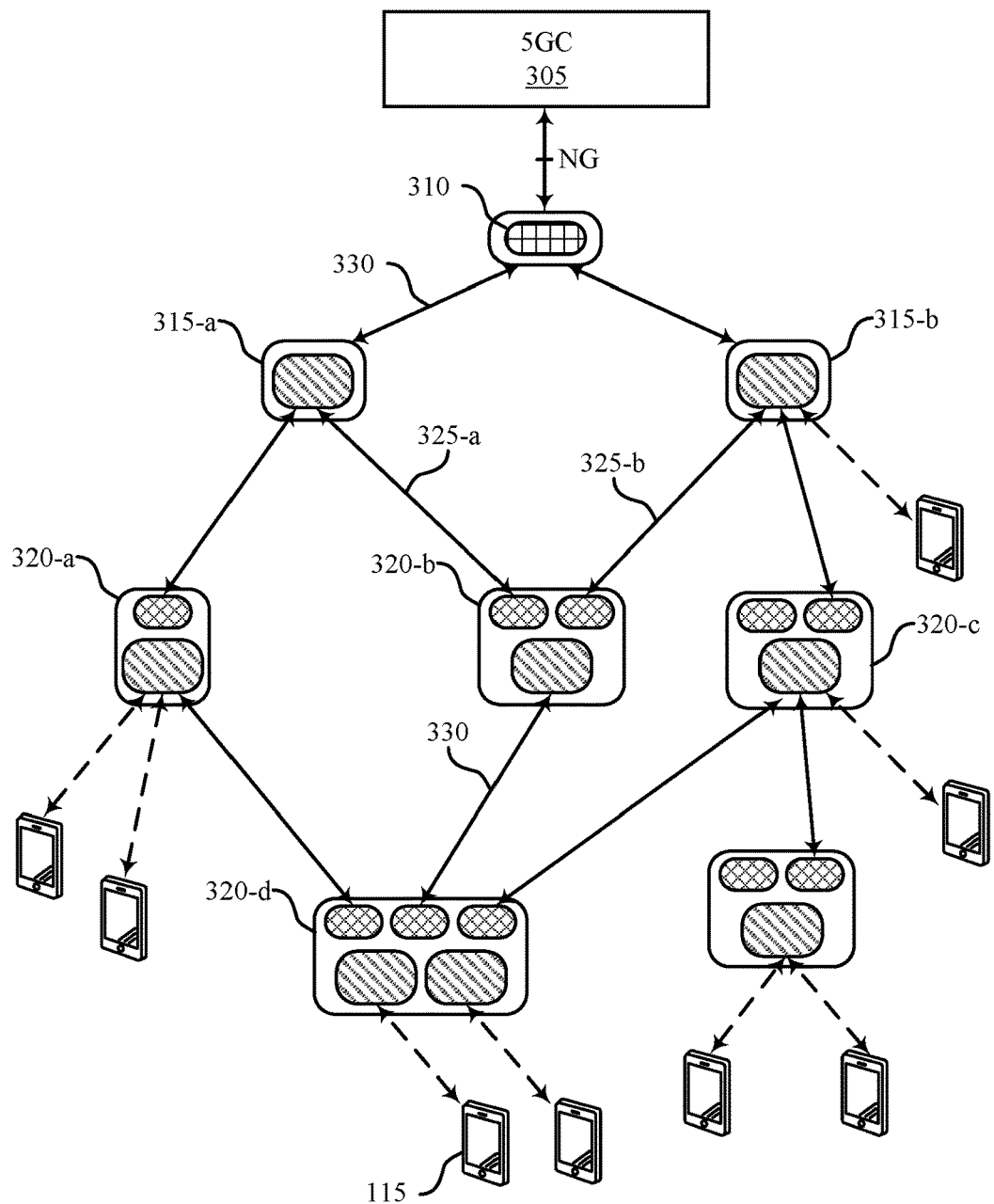
FIG. 3 illustrates an example of a wireless communications system that supports dynamic resource management in accordance with aspects of the present disclosure.

FIG. 3 illustrates an example of a wireless communications system 300 that supports dynamic resource management in accordance with one or more aspects of the present disclosure. In some examples, wireless communications system 300 may implement aspects of wireless communications system 100 and wireless communications system 200, as described with reference to FIGS. 1 and 2. For example, FIG. 3 illustrates a wireless communications system 300 (e.g., a NR system) that supports sharing of infrastructure and spectral resources for NR access with wireless backhaul link capabilities, in supplement to wireline backhaul connections, providing an IAB network architecture. Wireless communications system 300 may include a core network 305 (e.g., 5GC), and network devices 320 (e.g., base stations, IAB nodes, etc.) that may be split into one or more support entities (e.g., functionalities) for promoting wireless backhaul density in collaboration with network communication access.

Wireless communications system 300 may include a donor network device (e.g., a donor IAB node, donor base station, etc.) split into associated CU 310 and DU 315 entities, where DUs 315 associated with the donor network device may be partially controlled by the associated CU 310 of the network device. In some cases, CU 310, DU 315-a and DU 315-b may be located within a single device. In other cases, DU 315-a and DU 315-b of the donor network device may be externally located, and may be in wired or wireless communication with the CU 310. CU may be a component of a database, data center, core network, or network cloud, and may host layer 3 (L3) (e.g., radio resource control (RRC), service data adaption protocol (SDAP), packet data convergence protocol (PDCP), etc.) functionality and signaling. Further CU 310 of the donor network device may communicate with core network 305 over, for example, an NG interface (which may be an example of a portion of a backhaul link). DUs 315 may host lower layer, such as layer 1 (L1) and layer 2 (L2) (e.g., radio link control (RLC), media access control (MAC), physical (PHY), etc.) functionality and signaling. A DU 315 entity of a donor network node may support one of multiple serving cells of the network coverage according to connections associated with backhaul and access links of the IAB network. DUs 315 of the IAB donor node may control both access links and backhaul links within the corresponding network coverage and provide controlling and scheduling for descendant (e.g., child) relay network devices 320 and/or UEs 115.

Network devices 320 may be split into associated MT and DU entities. MT functionality (e.g., UE-F) of the relay IAB devices 320 (e.g., IAB nodes) may be controlled and/or scheduled by antecedent IAB nodes (e.g., by a donor network device or another upstream network device as its parent node) of the established connectivity via access and backhaul links of a coverage area. DUs associated with a network device 320 may be controlled by MT functionality of the network device (e.g., a DU of a network device may be controlled by the network device's own MT). In addition, DUs of the network devices 320 may be partially controlled by signaling messages (e.g., a message 330) from CU 310 entities of associated donor network devices of the network connection (e.g., via an F1-AP interface). The DUs of the network devices 320 may support one of multiple serving cells of the network coverage area. DU functionality (e.g., AN-F) may schedule child IAB nodes and UEs, and may control both access links and backhaul links under its coverage.

A network device 320 associated with a RAT may communicate with a donor network device CU (e.g., CU 310) via a backhaul link (e.g., wireline backhaul or wireless backhaul). Generally, one or more donor network device (e.g., IAB donors) may be in communication with one or more additional network devices 320 (e.g., IAB nodes or relay nodes) and one or more UEs 115. As an example, network device 320-d may support MT functionality controlled and scheduled by a donor network device and/or parent relative to the MT supported IAB nodes (e.g., such as network devices 320-b, 320-a, and 320-c). Network device 320-d may additionally support DU operability relative to additional entities (e.g., such as UEs 115) within the relay chain or configuration of the access network. For example, an IAB network architecture may include a chain of connected wireless devices (e.g., starting with a donor network device and ending with a UE 115, with any number of network devices 320 in between) via link resources that support NR access and backhaul capabilities (e.g., a wireline backhaul or wireless backhaul).

As discussed herein, a relay network device 320 may refer to a network device that include at least one MT function and one DU. The relay network device 320 may connect to a parent network device or a donor network device via a MT function, and may further support connections to UEs 115 and child network devices via the DU. In some cases, network device DUs and donor network device DUs may be connected to a centralized donor CU (e.g., CU 310), which may hold a network management function, or be connected to a network management function. In some cases, the network management function may support link management, route management, topology management, resource management, etc. for the wireless communications system 300 (e.g., the IAB network). The connection between DUs across wireless backhaul links may use a modified form of the F1 protocol (e.g., F1*). Each relay node MT function may include a radio resource control (RRC) connection to the CU 310. Further, each relay node DU may include a F1* control plane connection to the CU 310. In this manner, the network management function may support link configuration, route configuration, and resource configuration tasks for the wireless backhaul topology.

A relay network device 320 may relay communications between a parent network device (e.g., an IAB donor, or an IAB node upstream or higher on the relay chain) and a child network device (e.g., an IAB node downstream or lower on the relay chain). In some cases, the relay network device may refer to the DU or access node function (AN-F) of an intermediary IAB node. A child node may refer to an IAB node (e.g., the MT of the IAB node) or a UE that is the child of another IAB node (e.g., such as the relay node). A parent node in communication with the relay node may refer to an upstream IAB node (e.g., a network device closer to the donor network device or a network device with less hops to the wireline backhaul link to the core network) or an IAB donor (e.g., the DU/ANF of the IAB node or IAB donor). In some cases, a parent node may be referred to as a control node (e.g., a control node may refer to a parent node or a DU of a parent node in communication with an MT of a relay node or other intermediary IAB node).

As such, wireless communications system 300 may implement 5G NR technologies (e.g., such as mmW) to support an access network (e.g., between an access node, such as network devices 320, and UEs 115) and a backhaul network (e.g., between access node, such as network devices 320). An IAB donor may refer to a network device with a wireline connection to the core network, and an IAB node may refer to a network device that relays traffic to or from the anchor (e.g., the donor) through 1 or more hops. IAB networks may thus share resources between access and backhaul, and may reuse aspects of access network frameworks. An IAB node may hold MT and DU functions. For example, the MT function of network device 320-*d* may act as or serve as a scheduled node (e.g., similar to a UE) scheduled by its parent node (e.g., network device 320-*a*). The DU function of network device 320-*d* may act as or serve as a scheduling node that schedules child nodes of the network device 320-*d* (e.g., such as UEs 115). DU functionality of a network device may also schedule child IAB nodes downstream in the relay chain (e.g., DU function of network device 320-*a* may act as or serve as a scheduling node that schedules network device 320-*d*).

In some cases, wireless communications systems may assign resource direction types (e.g., for time-domain resources in NR). For example, a time-domain resource may be assigned (e.g., or configured by the network) as a downlink resource, an uplink resource or a flexible resource. A downlink (DL) resource may refer to a resource where downlink communication (e.g., downstream communications from a parent node to a child node) is allowed, such as synchronization signal block (SSB) resources, channel state information reference signal (CSI-RS) resources, physical downlink control channel (PDCCH) resources, physical downlink shared channel (PDSCH) resources, etc.). An uplink (UL) resource may refer to a resource where uplink communication (e.g., upstream communications from a UE or child node to a parent node) is allowed (e.g., such as physical random access channel (PRACH) resources, physical uplink control channel (PUCCH) resources, physical uplink shared channel (PUSCH) resources, sounding reference signal (SRS) resources, etc.). A flexible resource may refer to a resource where the communication direction may be overwritten (e.g., to uplink or downlink) later by a scheduling node (e.g., by a donor network device, a parent network device, etc.).

Wireless communications systems further may support different layers or different types of DL/UL/Flexible assignment and release (e.g., wireless communications systems may use different mechanisms or techniques to specify DL/UL/Flexible slot configurations). For example, radio resource control (RRC) messages may be used to convey semi-static slot configurations. Semi-static slot configurations (e.g., semi-static UL/DL/Flexible resource assignments configured via RRC signaling) may include cell-specific configurations (e.g., tdd-UL-DL-ConfigurationsCommon signaling in system information block (SIB)) and/or UE-specific configurations (e.g., tdd-UL-DL-ConfigurationsDedicated signaling in UE-specific RRC messages). Additionally or alternatively, wireless communications systems may use dynamic slot format indicators (SFIs) carried by group-common PDCCH (GC-PDCCH) to indicate UL/DL/Flexible resource assignments and releases. In some cases, slot configurations configured via RRC signaling and dynamic SFIs may be referred to as explicit resource type configuration. Wireless communications systems may also support implicit indication of resource types for slot configuration. For example, a downlink or uplink direction for a slot or resource may be implied by semi-static channel allocation using RRC messages. Additionally or alternatively, a downlink or uplink direction for a slot or resource may be implied by dynamic downlink control information (DCI) scheduling grant carried by PDCCH. For example, a resource allocated for SSB through RRC may imply a direction for the resource based on the channel assignment.

In addition to the various techniques for configuration of resource assignments described above, wireless communications systems may further support overwriting rules (e.g., or priority rules) for such configuration techniques. That is, wireless communications systems may have a set of overwriting rules to determine which configuration is to be used in instances where more than one resource assignment or slot configuration is received for a given set of resources. For example, flexible resources in semi-static slot configuration may be overwritten to downlink or uplink symbols by SFI or implicit indication (e.g., RRC resource type configuration may be overwritten by SFI or implicit configuration of resource type). As another example, flexible resources in SFI may be overwritten (e.g., to uplink or downlink) by a dynamic DCI grant. As yet another example, semi-static channel allocation with implied downlink or uplink direction may be cancelled by SFI indicating a flexible resource (e.g., an implicit uplink or downlink configuration may be overwritten as flexible via SFI). Other overwriting rules may also be implemented by analogy, without departing from the scope of the present disclosure.

In some examples, resource types may be defined or configured for different links between network devices (e.g., IAB nodes) in a wireless communications system. A network device may have one or more established parent links and one or more established child links. For example, network device 320-*b* may have parent links 325-*a* and 325-*b* for communications with parent nodes (e.g., in this case DU 315-*a* and DU 315-*b*). Network device 320-*b* may have a child link 330 for communication with a child node (e.g., network device 320-*d*). That is, a parent link may refer to a link between an MT of a network device 320 and a DU of a parent node, and a child link may refer to a link between a DU of a network device 320 and an MT of a child node. For example, link 330 may be referred to as a child link of network device 320-*b*, and may be referred to as a parent link of network device 320-*d*. In some cases, resources (e.g., resource type assignments, slot configurations, etc.) may be separately defined for a parent link and a child link.

Wireless communications systems may employ techniques for resource management in IAB networks. From an MT point-of-view, time-domain resources for a parent link may be configured as a downlink time resource, an uplink time resource, or a flexible time resource. From a DU point-of-view, time-domain resources for a child link may be configured as a downlink time resource, an uplink time resource, a flexible time resource, or a not available time resource (e.g., a resource type indicating the resource cannot be scheduled and is not to be used for communication on the DU child links).

Further, in some cases, some network devices may operate under a half-duplex constraint (e.g., where a network device may not transmit and receive at the same time). In some cases, parent and child node needs of a network device may conflict (e.g., a parent node and a child node may wish to communicate with a network device at the same time). Time division multiplexing (TDM) may be used between the MT and the DU of the network device to accommodate such needs. Further, a MT of a network device may be transparent with the parent node as to the child needs and the resources requested by the DU.

As such, there may be two different classes of availability or criteria for usage for each of the downlink, uplink, and flexible time-resource types of the DU child link. For example, each of the downlink, uplink, and flexible time-resource types of the DU child link may further be configured as either hard (e.g., child node controlled) or soft (e.g., parent node controlled). A hard resource configuration may result in the corresponding time resource always being available for the DU child link. A soft resource configuration may result in the availability of the corresponding time resource for the DU child link being explicitly and/or implicitly controlled by the parent node. As such a DU may be configured with the following resource types: downlink (DL) (e.g., hard downlink), uplink (UL) (e.g., hard uplink), flexible (F) (e.g., hard flexible), not available (N.A.), soft downlink (soft-DL), soft uplink (soft-UL), and soft flexible (soft-F). A soft resource (soft Rx) (e.g., soft-DL, soft-UL, or soft-F resource) may initially be unavailable for a DU's child link, and may be converted to a hard resource (hard Rx) (e.g., hard-DL, hard-UL, or hard-F resource) by a parent node (e.g., either explicitly or implicitly). Example resource assignments (e.g., resource type slot configurations) are described below, with reference to FIG. 4.

In some cases, wireless communications systems may support uplink capability reporting on full/half duplex capabilities. For example, a capability report message (e.g., transmitting in uplink signaling from a child node) may include the capability of the node (e.g., of the child node) in supporting full duplex or half duplex. Based on the capability report information, the central entity (e.g., CU 310 of the IAB donor) may make decisions on resource pattern assigned for each for each IAB node. For example, the CU 310 may receive capability information for child nodes (e.g., network devices 320) and may determine resource pattern assignments for the various child nodes based on their full/half duplex capabilities (e.g., to efficiently coordinate resource pattern assignments, leveraging full duplex capabilities where possible). If an IAB node only has half-duplex capability, then the resource pattern from its parent node over the parent link may be compatible with the resource pattern of the IAB node over its child links (e.g., to avoid half-duplex conflicts). That is, the resources of the parent link and child link of an IAB node capable of only half-duplex may be TDMed or SDM/FDMed with coordinated downlink/uplink directions. If an IAB node has full duplex capability, then there may be less or no restrictions on resource patterns over parent links and child links associated with the IAB node.

For example, an access node may identify a multiplexing mode (e.g., a TDM/SDM/FDM mode) employed by the wireless communications system. In some cases, the multiplexing mode may be indicated to the access node from the parent node. The multiplexing mode may refer to how the downlink communications and uplink communications to and from the access node are multiplexed such that the access node may communicate with the parent node and child node without violating the half duplex constraint. Communications may be multiplexed in different time TTI (e.g., TDM), or in a same TTI but separated in spatial domain (e.g., SDM) or frequency domain (e.g., FDM). Two resources may thus be multiplexed using SDM/FDM in a manner such that the access node may receive from both parent and child nodes without violating the half duplex constraint.

Figure 4:
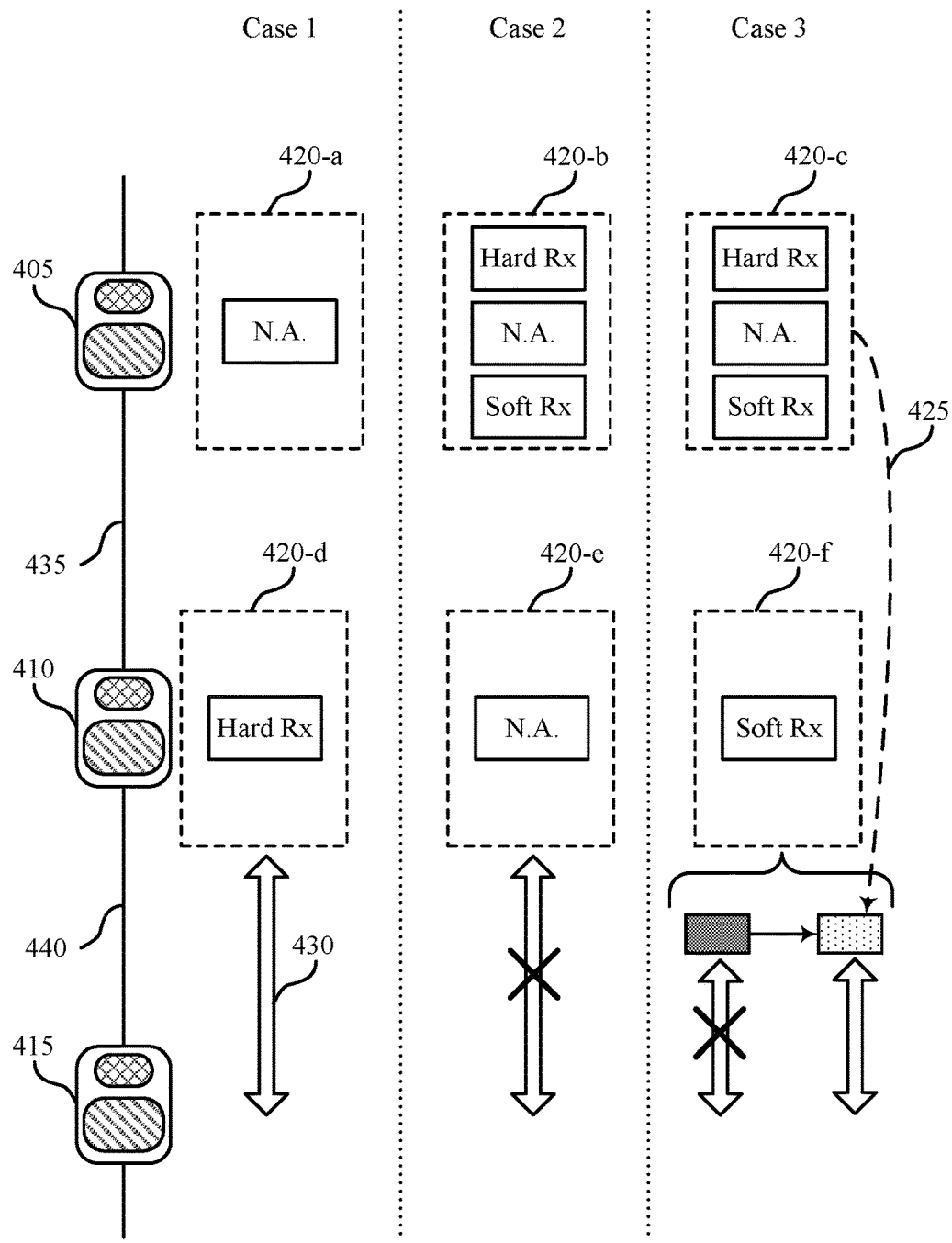
FIG. 4 illustrates an example of an integrated access and backhaul (IAB) chain that supports dynamic resource management in accordance with aspects of the present disclosure.

FIG. 4 illustrates an example of an IAB chain 400 that supports dynamic resource management in accordance with one or more aspects of the present disclosure. In some examples, IAB chain 400 may implement aspects of wireless communications system 100, wireless communications system 200, and wireless communications system 300. For example, IAB chain 400 may illustrate the perspective of IAB node 410 (e.g., a relay network device, a relay IAB node, etc.) and may include a parent node 405 and a child node 415, as described above with reference to FIGS. 1 through 3. Specifically, IAB chain 400 may illustrate three cases or scenarios of example resource type configurations for a parent link 435 between IAB node 410 and parent node 405 and a child link 440 between IAB node 410 and child node 415.

Network devices (e.g., IAB node 410 and parent node 405) may be configured with a resource during a given TTI (e.g., during a given slot or time resource). As discussed above, a resource may be associated with a resource type. Resource types may include DL, UL, F, N.A., soft-DL, soft-UL, and soft-F. A hard resource (Hard Rx) (e.g., DL, UL, F) may always be available for the DU child link. Not available resources (N.A.) are resources that cannot be scheduled or used for communication on the DU child links. A soft resource (Soft Rx) (e.g., soft-DL, soft-UL, soft-F) may initially be unavailable for a DU's child link, but may be converted to a hard resource (hard Rx) by a parent node via an indication 425.

As discussed above, network devices (e.g., IAB node 410) may operate under a half-duplex constraint (e.g., where IAB node 410 may not transmit and receive at the same time). As such, resources may be configured to avoid half-duplex conflicts within an IAB network (e.g., as illustrated by FIG. 4). For example, if a child link of IAB node 410 is configured with Hard Rx resource type, parent nodes of IAB node 410 (e.g., child link of parent node 405, connecting parent node 405 to IAB node 410) may be configured with a N.A. resource type, as IAB node 410 may communicate using its child link without input from parent node 405 (e.g., as illustrated in Case 1). If a child link of IAB node 410 is configured with a N.A. resource type, parent nodes of IAB node 410 (e.g., child link of parent node 405, connecting parent node 405 to IAB node 410) may be configured with any resource type, as the child link of IAB node 410 may not be used for communications (e.g., as illustrated in Case 2).

If a child link of IAB node 410 is configured with a soft resource type, parent nodes of IAB node 410 (e.g., child link of parent node 405, connecting parent node 405 to IAB node 410) may be configured with any resource type, as the child link of IAB node 410 may only be used for communications upon receipt of an indication 425 from parent node 405 (e.g., as illustrated in Case 3). In Case 3, the parent node 405 may thus overwrite (e.g., via the indication 425) the Soft Rx type of the child link of IAB node 410 to a Hard Rx type in scenarios where parent node 405 will not be using its child link. In scenarios where parent node 405 may use its child link, the parent node may refrain from overwriting the soft Rx type configured for the child link of IAB node 410, such that the IAB node 410 may not schedule the resource.

For example, case 1 illustrates parent node 405 configured with a child link resource type 420-a (a N.A. resource type). That is, the child link associated with the DU of parent node 405 may have a N.A. resource type configured, such that the parent node 405 may not schedule or communicate during the resource (e.g., the time slot or TTI associated with resource may be unavailable for uplink or downlink communication). As such, the child link associated with the DU of IAB node 410 may have a hard resource type configured as its child link resource type 420-d. IAB node 410 may be configured with a Hard Rx child link resource type 420-d as the parent node of IAB node 410 is configured with a N.A. child link resource type 420-a, ensuring the half-duplex constraint may not be violated. That is, IAB node 410 may be configured with a Hard Rx (e.g., DL, UL, F) as its parent node 405 is configured with a N.A. resource type, and thus may not communicate with the IAB node 410 during the particular resource. As such, IAB node 410 may communicate over link 430 (e.g., a child link with child node 415) during the resource using either downlink or uplink communications depending on whether the hard resource is configured as DL, UL, or F. In other words, in order for IAB node 410 to be configured with a Hard Rx child link resource type 420-d, each parent node of IAB node 410 (e.g., parent node 405) may be configured with N.A. resource types.

Case 2 illustrates IAB node 410 configured with a child link resource type 420-e (a N.A. resource type). As such, in Case 2, IAB node 410 may not communicate via the child link with child node 415. In such cases, the parent node 405 may be configured with a child link resource type 420-b that may be any of a Hard Rx resource type, Soft Rx resource type, or N.A. resource type (e.g., as IAB node 410 is sure to not communicate on its child link).

Case 3 illustrates IAB node 410 configured with a Soft Rx child link resource type 420-f (a soft resource type). In such cases, the parent node 405 may be configured with a child link resource type 420-c that may be any of a Hard Rx resource type, Soft Rx resource type, or N.A. resource type (e.g., as IAB node 410 may not communicate on its child link unless the soft resource is overwritten by parent node 405). For example, a Soft Rx type (e.g., child link resource type 420-f) may be a default non-schedulable state, but may be overwritten (e.g., may transition to a schedulable state) via an indication 425 from the parent node 405. In some cases, the indication 425 may overwrite the Soft Rx as either a hard DL, hard UL, or hard flexible resource type. In some cases, the parent node 405 may release resources (e.g., release its child link resources) and signal the indication 425 to IAB node 410 to overwrite the soft Rx resource type associated with the child link of IAB node 410 (e.g., such that the IAB node 410 may communicate over its child link without half-duplexing conflicts on its parent link with parent node 405).

Figure 5:
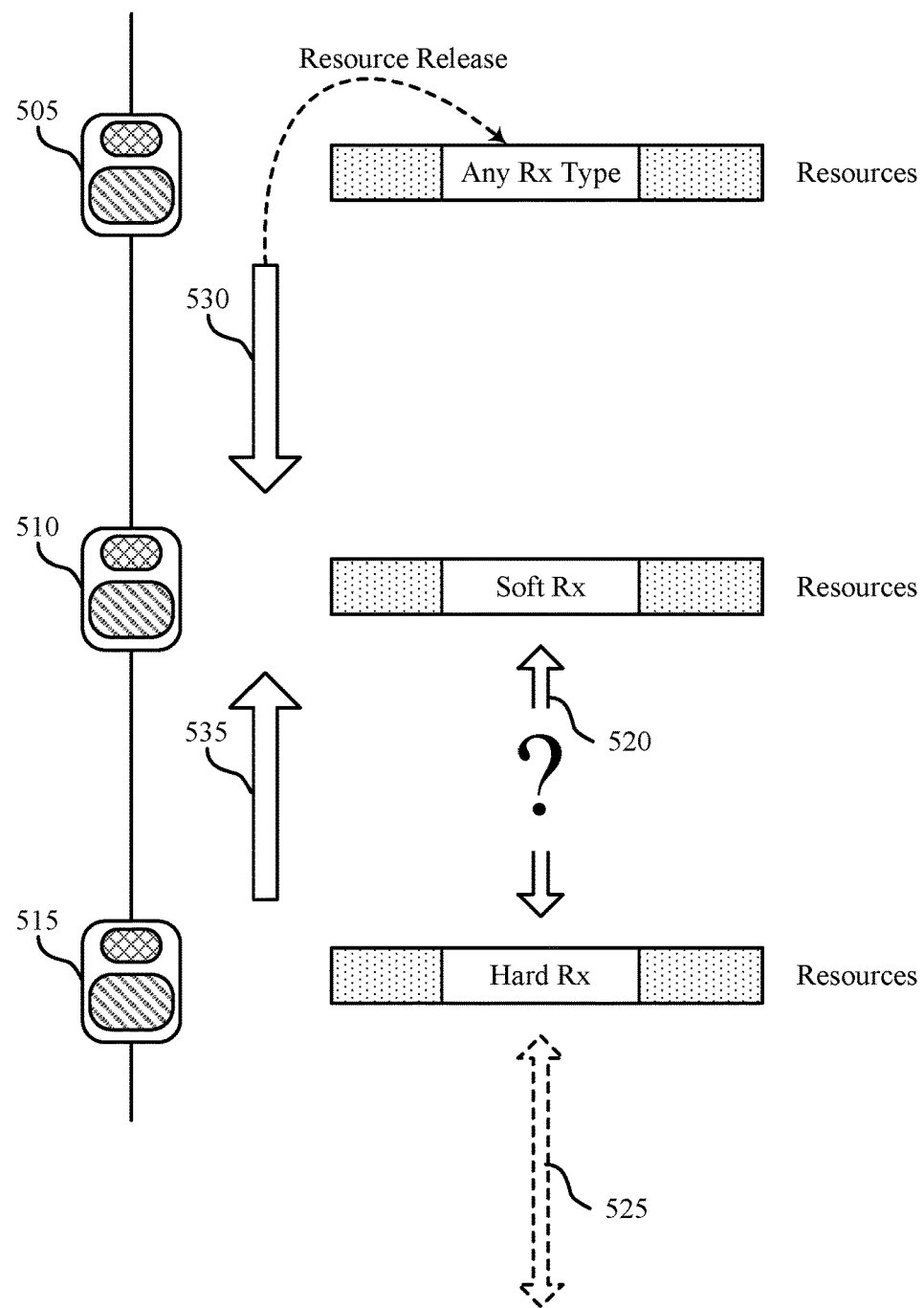
FIG. 5 illustrates an example of an IAB chain that supports dynamic resource management in accordance with aspects of the present disclosure.

FIG. 5 illustrates an example of an IAB chain 500 that supports dynamic resource management in accordance with one or more aspects of the present disclosure. In some examples, IAB chain 500 may implement aspects of wireless communications system 100, wireless communications system 200, and wireless communications system 300. For example, IAB chain 500 may illustrate the perspective of IAB node 510 (e.g., a relay network device, a relay IAB node, etc.) and may include a parent node 505 and a child node 515, as described above with reference to FIGS. 1 through 3. Specifically, IAB chain 500 may illustrate child node 515 release of child link 525 (e.g., child link of child node 515) resources via uplink indication 535 (e.g., uplink resource release indication) for more efficient resource assignments.

For example, consider a scenario where a child link resource of IAB node 510 (e.g., a resource of child link 520 from the perspective of IAB node 510) is assigned as a Soft Rx type and a child link resource of child node 515 (e.g., a resource of child link 525 from the perspective of child node 515) is assigned as a Hard Rx type. In such cases, without knowledge of whether child node 515 actually uses its child link Hard Rx resource, IAB node 510 may not communicate via its child link Soft Rx resource (e.g., as IAB node 510 may assume child node 515 is using its resources). However, in some cases, child node 515 may or may not have active communication on child link 525 (e.g., child node 515 may or may not be using the Hard Rx child link resources). If the child node 515 is not using resources of child link 525 (e.g., does not have active communication on the child link 525), then the IAB chain 500 may have resources that are not being utilized. That is, some resources within the IAB chain 500 may be wasted. IAB node 510 could have been using its child link soft RX resource, but the IAB node 510 is not aware that child node 515 was not using its hard RX child link.

As a solution to the above issues, wireless communications systems may employ uplink resource release indications 535 such that a child node (e.g., IAB node 515) may indicate a release of resources to its parent node (i.e., IAB node 510) and downlink resource release indications 530 such that a parent node 505 may indicate a resource release (e.g., via an explicit or implicit downlink indication) via downlink indication 530 to IAB node 510. IAB node 510 may use the resources (e.g., soft Rx child link 520 resources) upon receiving an uplink indication 535 that the child node 515 is releasing its Hard Rx child link 525 resources. The resource released by the parent node 505 and the resource released by the child node 515 may at least partially overlap in time (e.g., may include at least some the same resources (time resources)). Additionally, the resources released by the parent node 505 and/or child node 515, may or may not otherwise overlap, for example, may or may not overlap in frequency and/or beam direction (e.g., may or may not include at least some of the same frequency or beam resources).

Wireless communications systems may support uplink explicit or implicit indication (e.g., via indication 535) of resource release. For example, the indication may be carried by PUCCH or an uplink MAC CE. In some cases, the uplink indication of resource release may include an explicit message on whether resources are released or not. In other cases, the uplink indication of resource release may be transmitted using an on-off scheme, where "on" may indicate resource release and "off" may indicate no resource release (e.g., or vice versa). The resources for uplink indication (e.g., indication 535) and for downlink indication (e.g., indication 530) may utilize spatial division multiplexing (SDM)/frequency division multiplexing (FDM) or time division multiplexing (TDM). Using the described techniques, an IAB node 510 may determine whether it can use soft resources (Soft Rx) based on indications from both parent nodes (e.g., parent node 505) and child nodes (e.g., child node 515).

Figure 6A:
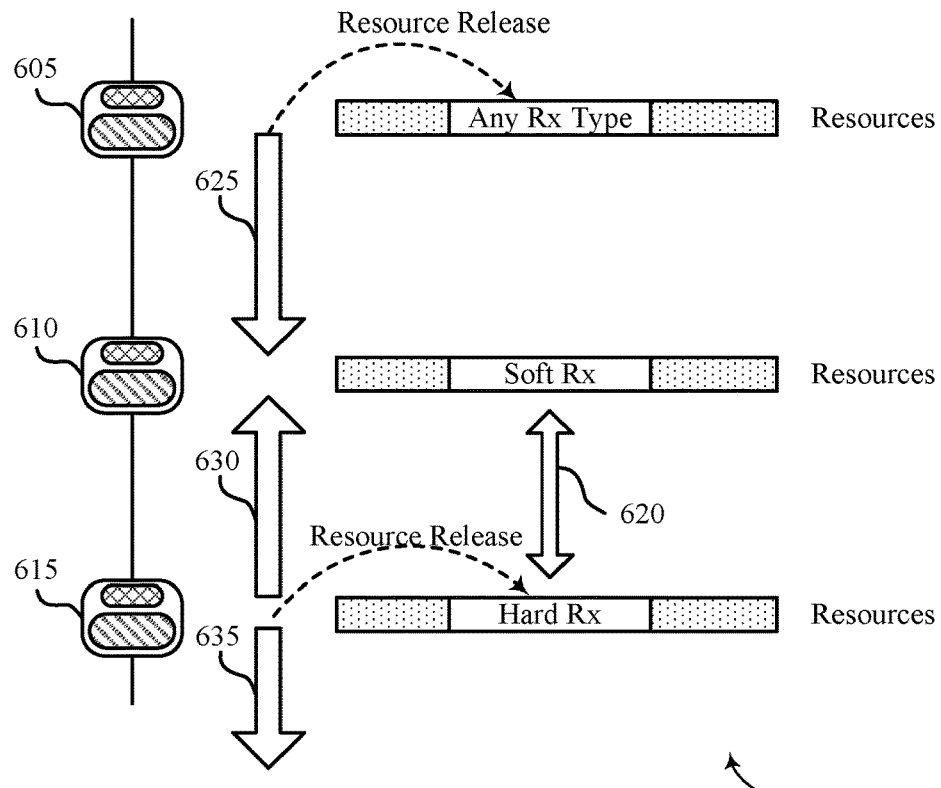
FIGS. 6A and 6B illustrate examples of IAB chains that support dynamic resource management in accordance with aspects of the present disclosure.
Figure 6B:
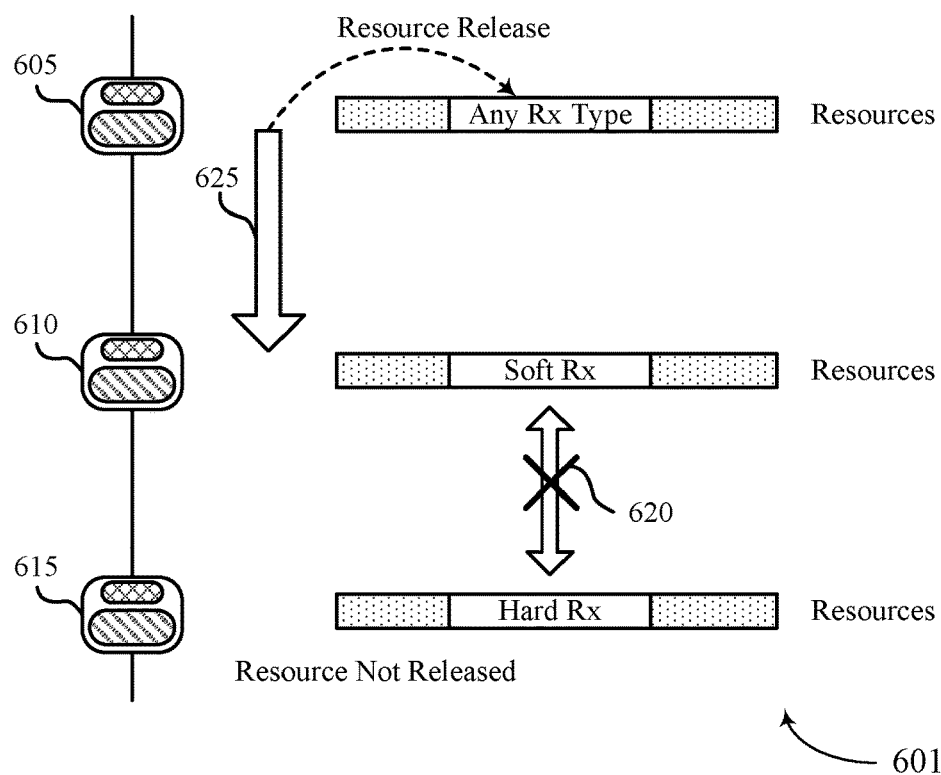

FIGS. 6A-B illustrate examples of IAB chain 600 and IAB chain 601 that each support dynamic resource management in accordance with one or more aspects of the present disclosure. In some examples, IAB chain 600 and IAB chain 601 may implement aspects of wireless communications system 100, wireless communications system 200, and wireless communications system 300. For example, IAB chain 600 and IAB chain 601 may illustrate the perspective of IAB node 610 (e.g., a relay network device, a relay IAB node, etc.) and may include a parent node 605 and a child node 615, as described above with reference to FIGS. 1 through 3. Specifically, IAB chain 600 may illustrate resource release from both parent node 605 and child node 615. For example, parent node 605 may release its resources via indication 625 (e.g., or in some cases may have N.A. configured resources, which may in some cases be referred to as an implicit indication), and child node 615 may release its resources via indication 630 and/or indication 635 (e.g., where indication 635 may be sent on the downlink to a child node of child node 615). As such, communication may be allowed on link 620 (e.g., IAB node 610 may schedule resources on its child link). IAB chain 601 may illustrate resource release from parent node 605 alone. For example, parent node 605 may release its resources via indication 625 (e.g., or in some cases may have N.A. configured resources, which may in some cases be referred to as an implicit indication). However, child node 615 may not release its resources. As the child node 615 is assigned Hard Rx, IAB node 610 may not communicate over its child link.

Figure 7A:
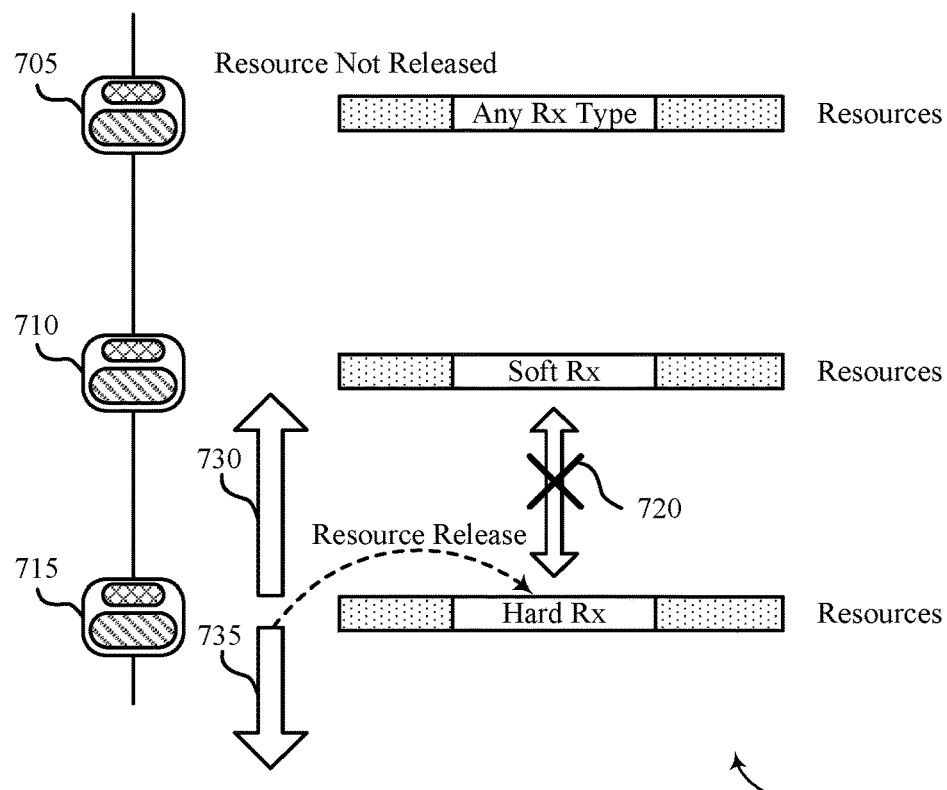
FIGS. 7A and 7B illustrate examples of IAB chains that support dynamic resource management in accordance with aspects of the present disclosure.
Figure 7B:
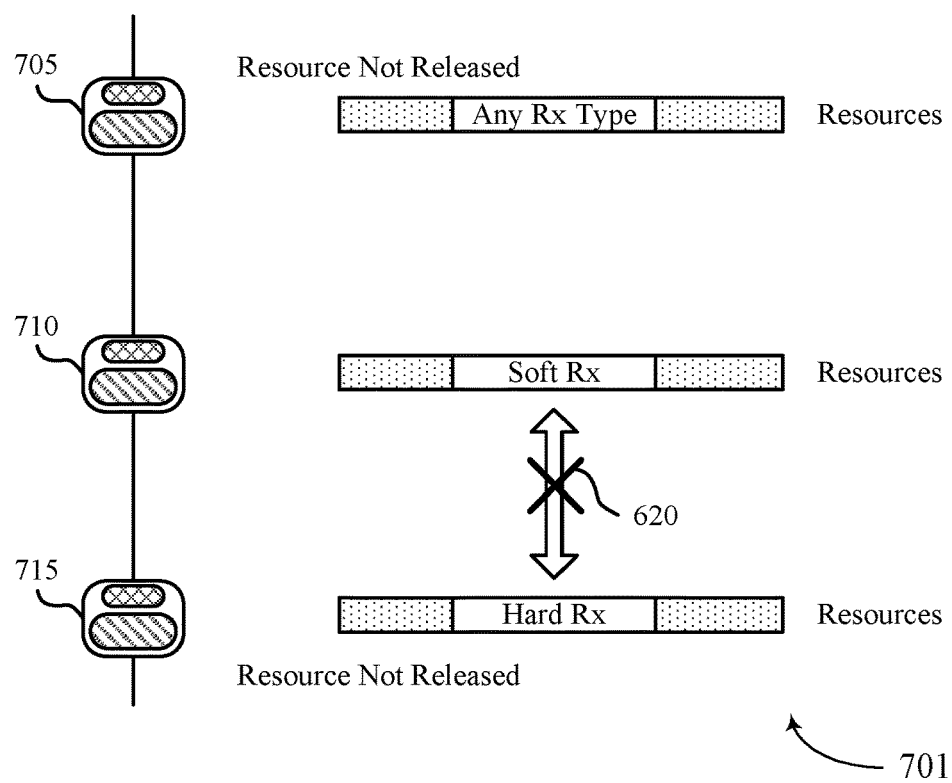

FIGS. 7A-B illustrate examples of IAB chain 700 and IAB chain 701 that each support dynamic resource management in accordance with one or more aspects of the present disclosure. In some examples, IAB chain 700 and IAB chain 701 may implement aspects of wireless communications system 100, wireless communications system 200, and wireless communications system 300. For example, IAB chain 700 and IAB chain 701 may illustrate the perspective of IAB node 710 (e.g., a relay network device, a relay IAB node, etc.) and may include a parent node 705 and a child node 715, as described above with reference to FIGS. 1 through 3. Specifically, IAB chain 700 may illustrate resource release from child node 715 alone. For example, a parent node 705 may not release its resources, and child node 715 may release its resources via indication 730 and/or indication 735 (e.g., where indication 735 may be sent on the downlink to a child node of child node 715). In such cases, communication may not be allowed on link 720 (e.g., IAB node 710 may not schedule resources on its child link), as the IAB node 710 may otherwise experience half-duplex conflicts as the parent node 705 may use its child link with IAB node 710 (e.g., as parent node 705 has not released its resources). IAB chain 701 may illustrate a scenario where neither parent node 705 nor child node 715 release their resources. In such cases, IAB node 710 may not communicate over its child link 720, as the child node 715 is assigned Hard Rx and may communicate with its own child node.

Figure 8A:
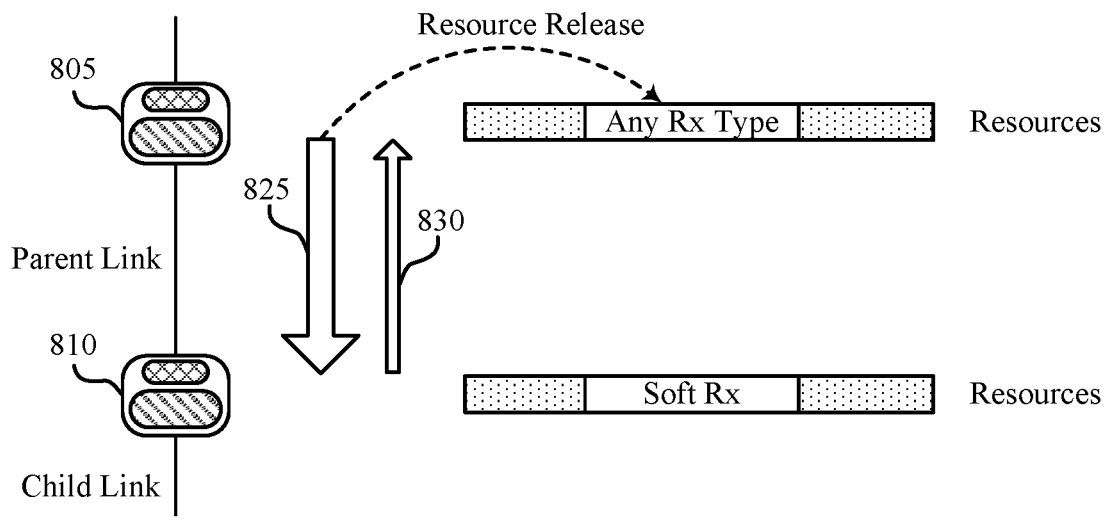
FIGS. 8A and 8B illustrate examples of IAB chains that support dynamic resource management in accordance with aspects of the present disclosure.
Figure 8B:
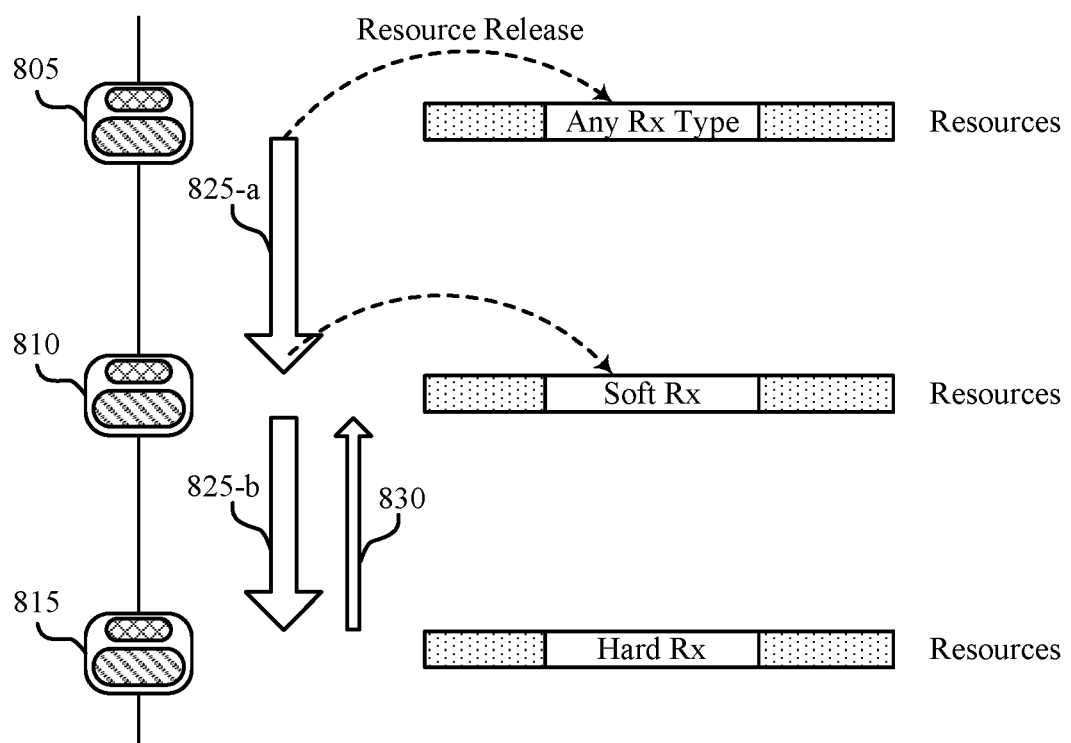

FIGS. 8A-B illustrate examples of IAB chain 800 and IAB chain 801 that each support dynamic resource management in accordance with one or more aspects of the present disclosure. In some examples, IAB chain 800 and IAB chain 801 may implement aspects of wireless communications system 100, wireless communications system 200, and wireless communications system 300. For example, IAB chain 800 may illustrate SFI signaling from parent node 805 as well as acknowledgement to SFI (e.g., acknowledgement (ACK)/negative acknowledgement (NACK) 830) from IAB node 810, as described above. IAB chain 801 may illustrate SFI signaling from IAB node 810 as well as acknowledgement to SFI (e.g., ACK/NACK 830) from child node 815, as described above.

Wireless communications systems may support acknowledgment to SFI (e.g., ACK/NACKs 830). In an IAB network, SFI framework may be enhanced to support dynamic resource coordination (e.g., in 5GNR, SFI may be used to dynamically update slot format configuration). An enhanced SFI (e.g., a SFI with an ACK request field) received from a parent node (e.g., parent node 805) may impact an IAB node's (e.g., IAB node 810) scheduling decision over its child links. For example, an enhanced SFI (e.g., SFI 825) received from parent node 805 may carry explicit or implicit indication to control soft resources of the IAB node 810. In some examples, an enhanced SFI 825 may indicate that a previously non-scheduled resource is updated as a schedulable resource. In some cases, it may be beneficial that the IAB node 810 may reject the received SFI 825 from the parent node (e.g., via sending a NACK 830) if the SFI impact to the IAB node's scheduling decision is undesirable. In some cases, the uplink signaling message carrying the ACK/NACK 830 (e.g., for SFI 825) may be PUCCH or an uplink MAC CE. Additional information such as a set of acceptable or unacceptable resources indicated by SFI may be included. When ACK request in SFI 825 is set to 1, the IAB node 810 may decide ACK or NACK based on the impact of received SFI to its scheduling decision over child links. If the IAB node 810 decides to indicate a NACK 830, the whole SFI or part of the SFI (e.g., in cases where additional information is provided) may be invalid. In general, for any signaling message that is enhanced to support dynamic resource coordination controlled by parent node, similar proposal may be made to support acknowledgement as for SFI.

Parent node 805 may transmit downlink signaling that includes an enhanced SFI 825. The enhanced SFI 825 may include an acknowledgement request field (e.g., a toggle bit indicating whether and ACK/NACK is requested in response to the SFI), and may indicate a release of resources (e.g., a release of resources associated with the child link of parent node 805). In cases where the enhanced SFI 825 requests acknowledgement, IAB node 810 may respond with an ACK/NACK 830 (e.g., an ACK 830 to acknowledge the SFI 825, or a NACK 830 to negatively acknowledge or reject the SFI 825). For example, SFI 825 may include a request for an acknowledgement (e.g., ACK request=1) and may also indicate the parent node 805 is releasing its resources. The IAB node 810 may send an ACK 830 when the IAB node 810 needs extra resources (e.g., when the IAB node 810 may use the child link resources corresponding to the resources released by the SFI 825). In other cases, IAB node 810 may send a NACK 830 when IAB node 810 does not need extra resources (e.g., IAB node 810 may send a NACK 830 when the IAB node 810 does not need, or will not use, the child link resources corresponding to the resources released by the SFI 825).

In the example of IAB chain 801, parent node 805 may transmit downlink signaling that includes SFI 825-*a* (e.g., which may or may not request acknowledgement), and IAB node 810 may transmit downlink signaling that includes SFI 825-*b*. For example, IAB node 810 may transmit updated SFI 825-*b* with Soft Rx resources changed to DL/UL/Flexible (e.g., with an ACK request=1). The child IAB node 815 may receive the SFI 825-*b*, and may respond with an ACK/NACK 830. The child IAB node 815 may respond with an ACK 830 if the child node 815 does not intend to make any scheduling on Hard Rx resources. For example, an ACK 830 from child node 815 may indicate that the child node 815 will not be using its Hard Rx resources, such that IAB node 810 may use its soft resources. The child IAB node 815 may respond with a NACK 830 if the child node 815 will schedule on Hard Rx resources. That is, in some examples, enhanced SFI (e.g., SFI including an acknowledgement request) may be used to request usage of soft resources in cases where a child node is assigned hard resources (e.g., as a parent node may transmit downlink signaling including the SFI, and a child node may respond with an ACK/NACK depending on whether or not the child node will be using its hard resources, effectively indicating whether or not the parent node may use its soft resources).

Figure 9:
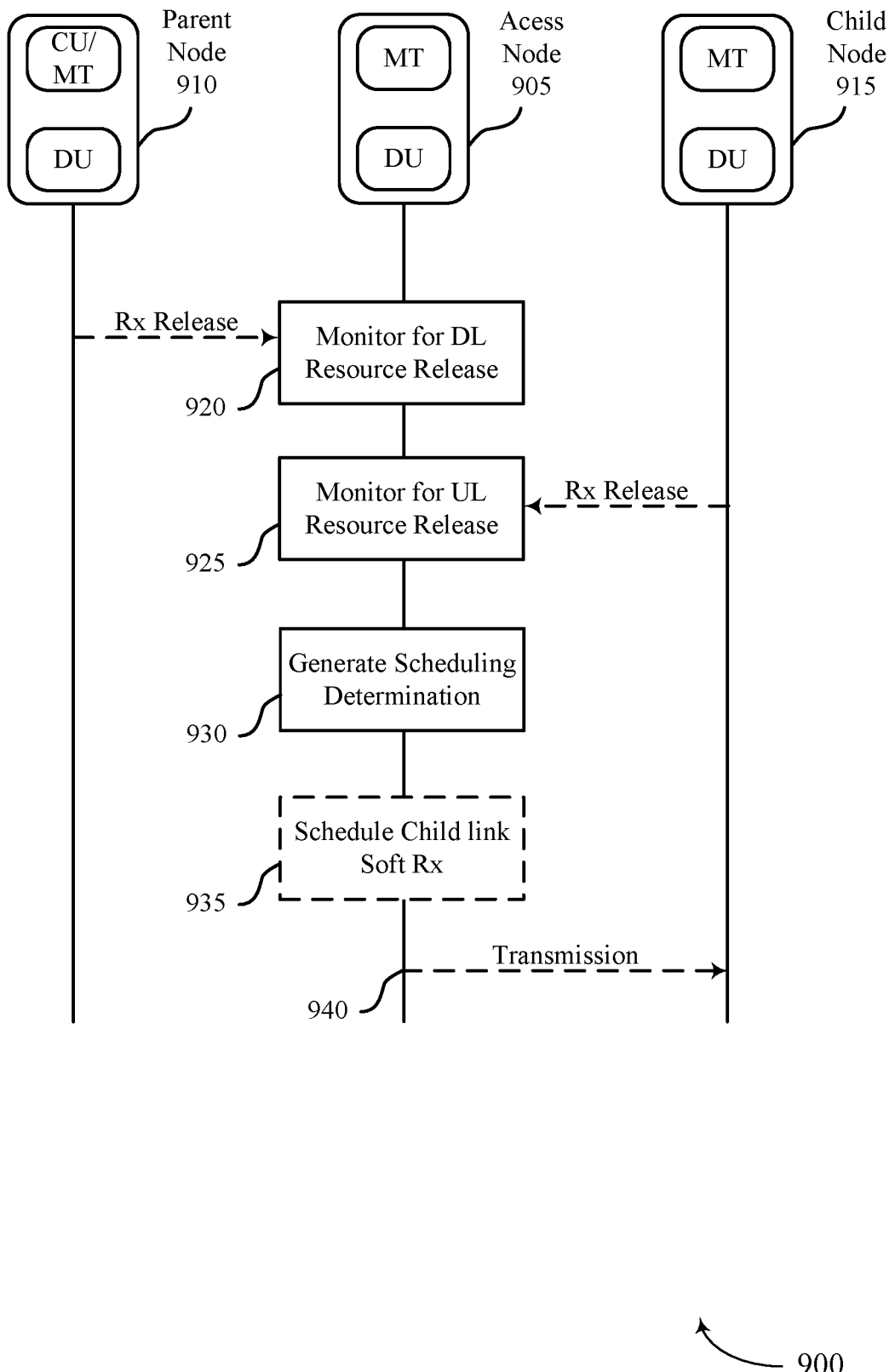
FIG. 9 illustrates an example of a process flow that supports dynamic resource management in accordance with aspects of the present disclosure.

FIG. 9 illustrates an example of a process flow 900 that supports dynamic resource management in accordance with aspects of the present disclosure. In some examples, process flow 900 may implement aspects of wireless communication system 100. Process flow 900 may include an access node 905 (e.g., a network device, an IAB node, etc.), a parent node 910, and a child node 915, which may be examples of the corresponding devices as described with reference to FIGS. 1 through 8. Process flow 900 may illustrate uplink resource release indication (e.g., child node 915 resource release indications), which may provide for access node 905 utilization of a parent node controlled resource (e.g., a soft resource) in scenarios where the child node 915 is configured with a child node controlled resource (e.g., a hard resource). In the following description of the process flow 900, the operations between the access node 905, parent node 910, and child node 915 may be transmitted in a different order than the exemplary order shown, or the operations performed by the access node 905, the parent node 910, and the child node 915 may be performed in different orders or at different times. In some cases, certain operations may also be left out of the process flow 900, or other operations may be added to the process flow 900.

At 920, access node 905 may monitor for a downlink indication indicating a resource release of a parent node 910 controlled resource, where the resource release indicates availability of the parent node 910 controlled resource for a link configured between the access node 905 and a child access node 915. In some cases, the first resource may be a resource allocated for use in a link configured between the access node 905 and the parent node 910. As such, the first resource may be a parent node 910 controlled resource. In some cases, monitoring for the downlink indication indicating a resource release may include monitoring for a PDCCH message or a downlink MAC message comprising the downlink indication. In some cases, the access node 905 may determine if the downlink indication is detected based on an on-off signaling scheme. In some cases, monitoring for the downlink indication may include monitoring a SDM resource, a FDM resource, or a TDM resource for the downlink indication. For example, access node 905 may identify a multiplexing mode (e.g., a TDM/SDM/FDM mode) employed by the wireless communications system. In some cases, the multiplexing mode may be indicated to the access node 905 from the parent node 910. The multiplexing mode may refer to how the downlink indication and uplink indication are multiplexed such that the access node 905 may receive the uplink indication (e.g., from child node 915) and the downlink indication (e.g., from parent node 910) without violating the half duplex constraint. The access node 905 may thus monitor for and receive the downlink indication (e.g., at 920) and the uplink indication (e.g., at 925) according to the multiplexing mode.

At 925, access node 905 may monitor for an uplink indication indicating a resource release of a child node 915 controlled resource (e.g., a soft resource for a child link of access node 905) indicating availability of the child node controlled resource for the link configured between the access node 905 and the child node 915. The child node controlled resource may be a resource used in link between the child node 915 and a child node of the child node 915 (e.g., a grandchild node of the access node 905). The child node controlled resource may be the same resource as the parent node controlled resource. That is, the child node controlled resource may at least partially overlap (e.g., in time) with the parent node controlled resource that was indicated as available. In some cases, monitoring for the uplink indication indicating a resource release may include monitoring for a PUCCH or uplink MAC message. In some cases, the access node 905 may determine if the uplink indication is detected based on an on-off signaling scheme. In some cases, monitoring for the uplink indication may include monitoring a SDM resource, a FDM resource, or a TDM resource for the uplink indication.

The downlink resource release indication may be in the form of a slot format indicator (SFI) carried by a GC-PDCCH, a DCI scheduling grant carried by a PDCCH, or a DL MAC CE. For example, one or more of these message types may include a field, bit, or flag (e.g., explicitly released) corresponding to the released resources. In other cases, a DCI scheduling grant may implicitly indicate that one or more unscheduled resources are released. In some cases, a resource releases is associated with a time, which may be configured at a UE 115 or configured via RRC messaging. For example, a resource release indication may be a one-time release, or a semi-persistent release (e.g., the resources are released until the resources are recalled later). In such cases, additional DL signaling message may be used to reclaim the released resources. For example, a PDCCH or DL MAC-CE may reclaim a released resource. Further the access code 905 may notify the parent node 910 of return of unused released resources. This UL message may be carried by a PUCCH or UL MAC CE. The uplink resource release indication from the child node 915 may in the form of a UL MAC CE or a PUCCH message. The UL MAC CE or PUCCH message may include a field, bit, or flag corresponding to the released resources. In some cases, the release indications may be carried using an on-off scheme, where "on" may indicate resource release and "off" may indicate no release (or vice versa). For example, a bitmap with bits indicating on (1) or off (0) may be included in an uplink or downlink resource release indication.

At 930, access node 905 may schedule or not schedule the parent node controlled resource for the link configured between the access node 905 and the child node 915 based at least in part on whether both the downlink indication and the uplink indication are received. For example, the scheduling determination (e.g., scheduling or not scheduling) may include determining that one or both of the downlink indication and the uplink indication have not been received, and determining to not to schedule the parent node controlled resource. In other examples, the scheduling determination may include determining that both the downlink indication and the uplink indication were received, and determining to schedule the parent node controlled resource.

At 935, in some cases (e.g., when both the downlink indication and the uplink indication were received at 920 and 925), the access node 905 may schedule a transmission with the child node 915 via the parent node controlled resource.

At 940, in cases where the access node 905 schedules a transmission based on receiving uplink and downlink resource release indications, access node 905 may transmit or receive a transmission via the parent node controlled resource of the link based at least in part on the scheduling.

Figure 10:
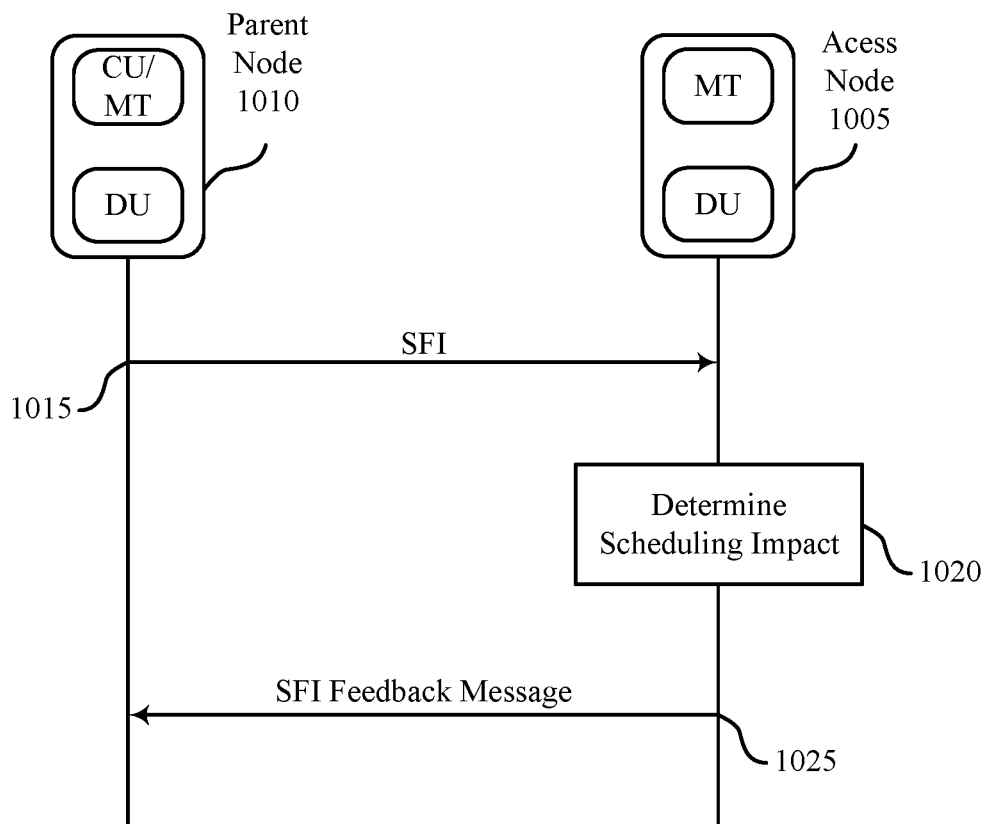
FIG. 10 illustrates an example of a process flow that supports dynamic resource management in accordance with aspects of the present disclosure.

FIG. 10 illustrates an example of a process flow 1000 that supports dynamic resource management in accordance with aspects of the present disclosure. In some examples, process flow 1000 may implement aspects of wireless communication system 100. Process flow 1000 may include an access node 1005 (e.g., a network device, an IAB node, etc.) and a parent node 1010, which may be examples of the corresponding devices as described with reference to FIGS. 1 through 9. Process flow 1000 may illustrate enhanced SFI signaling (e.g., SFI signaling with an acknowledgement request field), which may provide mechanisms for child node resource requests and child node resource release. In the following description of the process flow 1000, the operations between the access node 1005 and the parent node 1010 may be transmitted in a different order than the exemplary order shown, or the operations performed by the access node 1005 and the parent node 1010 may be performed in different orders or at different times. In some cases, certain operations may also be left out of the process flow 1000, or other operations may be added to the process flow 1000.

At 1015, access node 1005 may receive, from parent node 1010, downlink signaling indicating a slot format and a feedback request (e.g., downlink signaling including enhanced SFI). In some cases, the downlink signaling may indicate that a resource previously indicated to be non-schedulable is now schedulable, indicate availability of a parent-node controlled resource of a link configured between the parent access node and the access node, etc.

At 1020, access node 1005 may determine (e.g., based on the indicated slot format) an impact on scheduling for a link configured between the access node 1005 and a child access node of the access node 1005. For example, the access node 1005 may determine whether the indicated slot format impacts a link between the access node 1005 and a child node of the access node 1005. For example, if the SFI indication carries an explicit or implicit indication to control soft resources of the access node 1005, and these soft resources are being used (or being considered for use) with a link between the access node 1005, then the access node may determine that the indicated slot format impacts the link configured between the access node 1005 and the child node of the access node 1005. Similarly, the SFI may indicate that a previously non-scheduled resource is updated as a schedulable resource. Thus, the access node 1005 may determine that the updated resource impacts the link between the access node 1005 and a child access node of the access node 1005. In some cases, the access node 1005 may determine that the SFI violates a half-duplex constraint, and thus impacts the link between the access node 1005 and the child node of the access node 1005.

At 1025, access node 1005 may transmit a feedback message (e.g., and ACK or a NACK) indicating acceptance or rejection of the indicated slot format based at least in part on the feedback request and the impact. In some cases, the feedback message may be included in a PUCCH message or an uplink MAC message indicating acceptance (e.g., ACK) or rejection (e.g., NACK) of the indicated slot format (e.g., based on the determined scheduling impact). In some cases, the feedback message (e.g., an ACK) may indicate a request to use a parent-controlled resource of the link to accept the indicated slot format. In some cases, the feedback message (e.g., an NACK) may indicate a decline to use a parent-controlled resource of the link to reject the indicated slot format. In some cases the feedback message may indicate to the parent node 1010 whether the child link is scheduled (e.g., access node 1005 may reject, or NACK, the slot format if the child link is scheduled). That is, the feedback message may be used by the access node 1005 to request to use a parent-controlled resource, to decline to use a parent-controlled resource, to indicate that a child-controlled resource of the link is unscheduled and to accept the indicated slot format, to indicate that a child-controlled resource of the link is scheduled and to reject the indicated TTI format, etc. Such may be based on the scheduling impact of the indicated slot format. For example, the access node 1005 may transmit a NACK in cases where the SFI (e.g., the TTI format indicator) would otherwise result in the access node 1005 violating the half duplex constraint, when the access node 1005 will not use the resources, when the access node 1005 has scheduled communications with its child node that would conflict with the TTI format, etc.

Figure 11:
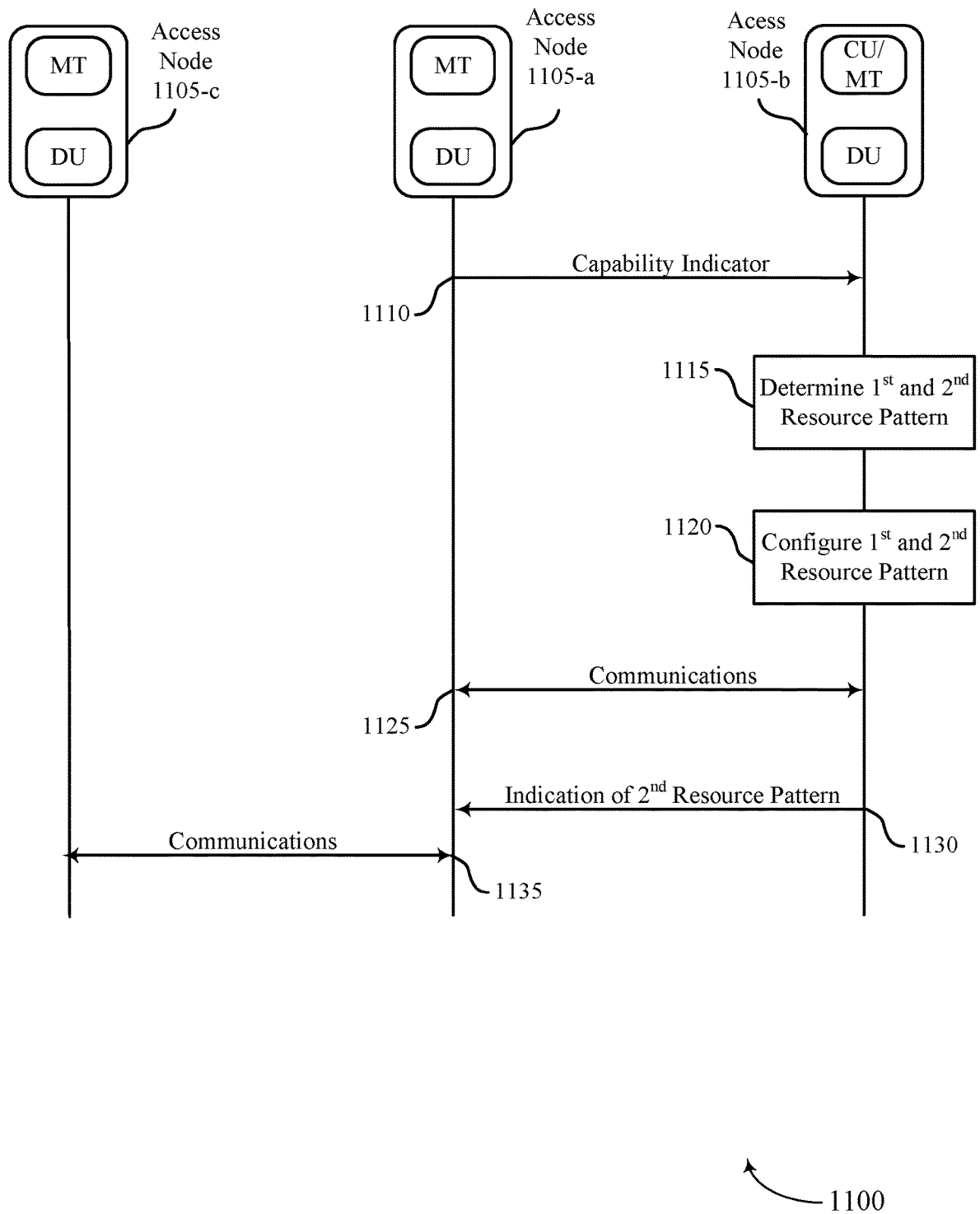
FIG. 11 illustrates an example of a process flow that supports dynamic resource management in accordance with aspects of the present disclosure.

FIG. 11 illustrates an example of a process flow 1100 that supports dynamic resource management in accordance with aspects of the present disclosure. In some examples, process flow 1100 may implement aspects of wireless communication system 100. Process flow 1100 may include access node 1105-*a*, access node 1105-*b*, and access node 1105-*c* (e.g., network devices, IAB nodes, etc.), which may be examples of the corresponding devices as described with reference to FIGS. 1 through 10. Process flow 1100 may illustrate an access node determining resource patterns for communication links (e.g., in an IAB network) based on uplink capability reports (e.g., of half/full duplex capabilities) from child nodes (e.g., access node 1105-*a* and access node 1105-*c*). In the following description of the process flow 1100, the operations between the access nodes 1105 may be transmitted in a different order than the exemplary order shown, or the operations performed by the access nodes 1105 may be performed in different orders or at different times. In some cases, certain operations may also be left out of the process flow 1100, or other operations may be added to the process flow 1100.

At 1110, access node 1105-*b* may receive a capability indicator from access node 1105-*a*. In some cases, access node 1105-*b* may be a parent node of access node 1105-*a*. In other cases, access node 1105-*b* may be a CU in control of access node 1105-*a*.

At 1115, access node 1105-*b* may determine a first resource pattern for a first link between the access node 1105-*b* and access node 1105-*a* and a second resource pattern for a second link between the access node 1105-*a* and a child access node 1105-*c* of the access node 1105-*a* based at least in part on the capability indicator. For example, access node 1105-*b* may determine a first resource pattern for a access node 1105-*b* parent link and a second resource pattern for an access node 1105-*a* child link such that no half-duplex conflicts arise for the access node 1105-*b*. For example, the access node 1105-*b* may receive capability information from child access nodes 1105-*a* and 1105-*c* and may determine resource pattern assignments for the access nodes 1105-*a* and 1105-*c* based on their full/half duplex capabilities (e.g., to efficiently coordinate resource pattern assignments, leveraging full duplex capabilities where possible). If access node 1105-*a* only has half-duplex capability, then the resource pattern for the link between the access node 1105-*b* and access node 1105-*a* (e.g., the first link) may be compatible with the resource pattern of the link between access node 1105-*a* and access node 1105-*c* (e.g., to avoid half-duplex conflicts). That is, the resources of the parent link (e.g., the first link between the access node 1105-*b* and the access node 1105-*a*) and child link (e.g., the second link between access node 1105-*a* and access node 1105-*c*) of access node 1105-*a* capable of only half-duplex may be TDMed or SDM/FDMed with coordinated downlink/uplink directions. If access node 1105-*a* has full duplex capability, then there may be less or no restrictions on resource patterns over parent links (e.g., the first link) and child link (e.g., the second link) associated with the access node 1105-*a*.

At 1120, access node 1105-*b* may configure the first resource pattern and the second resource pattern to support a TDM scheme between the first link and the second link based at least in part on the capability indicator indicating that the second access node has a half-duplex capability. For example, access node 1105-*b* may configure the first resource pattern and the second resource pattern to coordinate a transmit state and receive state for the first and second links.

At 1125, access node 1105-*a* and access node 1105-*b* may communicate via the first link in accordance with the first resource pattern.

At 1130, access node 1105-*b* may communicate an indicator of the second resource pattern to access node 1105-*a*, such that the access node 1150-*b* may communicate with the child access node 1105-*c* in accordance with the second resource pattern At 1135, access node 1105-*b* and access node 1105-*c* may communicate via the second link in accordance with the second resource pattern.

Figure 12:
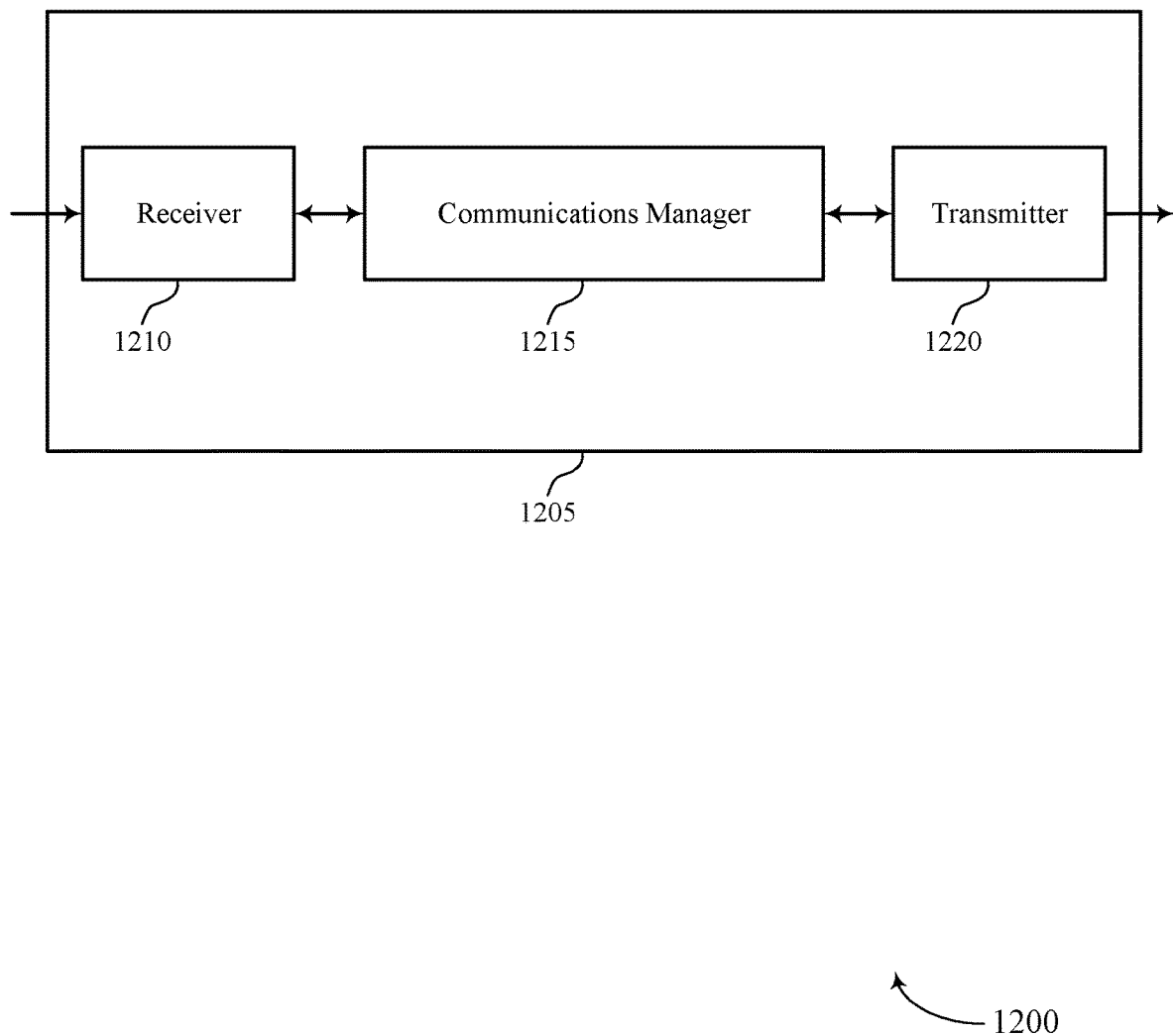
FIGS. 12 and 13 show block diagrams of devices that support dynamic resource management in accordance with aspects of the present disclosure.

FIG. 12 shows a block diagram 1200 of a device 1205 that supports dynamic resource management in accordance with aspects of the present disclosure. The device 1205 may be an example of aspects of an access node (e.g., a network device, IAB node, relay node, etc.) as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to dynamic resource management, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may monitor for a downlink indication indicating a resource release of a parent node controlled resource, where the resource release indicates availability of the parent node controlled resource for a link configured between the access node and a child access node, monitor for an uplink indication indicating a resource release of a child access node controlled resource that is at least partially overlapping in time with the parent node controlled resource, where the resource release of the child access node controlled resource indicates availability of the child access node controlled resource for the link configured between the access node and the child access node, and schedule the parent node controlled resource for the link configured between the access node and the child access node based on reception of both the downlink indication and the uplink indication. The communications manager 1215 may also receive, from a parent access node, downlink signaling indicating a slot format and a feedback request, determine, based on an indicated slot format, an impact on scheduling for a link configured between the access node and a child access node of the access node, and, responsive to the feedback request, transmit a feedback message indicating acceptance or rejection of the indicated slot format based on the scheduling impact. The communications manager 1215 may also receive a capability indicator from a second access node, determine a first resource pattern for a first link between the second access node and the first access node and determine a second resource pattern for a second link between the second access node and a child access node of the second access node based on the capability indicator, communicate via the first link in accordance with the first resource pattern, and transmit an indicator of the second resource pattern to the second access node. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

In some examples, the communications manager 1215 may be implemented as an integrated circuit or chipset for a mobile device modem, and the receiver 1210 and transmitter 1220 may be implemented as analog components (e.g., amplifiers, filters, antennas) coupled with the mobile device modem to enable wireless transmission and reception over one or more bands.

The communications manager 1215 as described herein may be implemented to realize one or more potential advantages. One implementation may allow the device 1205 to more efficiently allocate parent node control resources for communication with a child node. For example, the device may monitor uplink and downlink channels for respective resource releases and schedule a parent node controlled resource for communication with a child node. As such, released (e.g., unused) resources may be used for more efficient/robust communication with a child node.

Based on implementing the resource allocation techniques described herein (e.g., receiving a downlink indication and an uplink indication), a processor of a UE 115 (e.g., device 1205), which may control the receiver 1210, the transmitter 1220, or the transceiver 1520 as described with reference to FIG. 15, may increase reliability and efficiencies of communication over a communication link with a child node. Further, based on receiving the uplink and downlink resource release indications, the process may turn on one or more processing units for communicating over the second link, increase a processing clock, or a similar mechanism within the UE 115. As such, when releases are received, the processor may be ready to communicate more efficiently through the reduction of a ramp up in processing power.

One example advantage of monitoring for a second downlink indication and a second uplink indication and determining that one or both of the second downlink indication and the second uplink indication have not been received, and not scheduling the parent node controlled resource based on the determination that the one or both of the second downlink indication and the second uplink indication have not been received is that the device does not try to use allocated resources for communication with the child node. That is, the resources are being used on a first link, and as such, the device 115 may avoid issues caused by using allocated resources for communication on a second link. Further, the processor of the UE 115 is configured to process the utilized resources, and not used to process the same resource for two different links, which may waste resources.

One example advantage of scheduling a transmission with the child access node via the parent node controlled resource and transmitting or receiving the transmission via the parent node controlled resource of the link based at least in part on the scheduling is that resources are not wasted (e.g., not being used) and the resources may be used to enhance (e.g., utilize more efficiently) the communication link between the access node and the child node. Further, a processor may be utilized more efficiently using the additional resources on the second link.

One example advantage of monitoring for the downlink indication by monitoring for a physical downlink control channel or for a downlink medium access control message and monitoring for the uplink indication by monitoring for a physical uplink control channel message or for an uplink medium access control message is that the device is able to efficiently identify when one or more resources are released, and use the released resources for communication on a child link. Further, the processor is ramped up such that it is ready to process the indication, thus conserving processing power.

Another potential advantage is based on allocation of resources according to an indicated slot format. In one implementation, an access node receives, from a parent access node, downlink signaling indicating a slot format and a feedback request, determines, based at least in part on the indicated slot format, an impact on scheduling for a link configured between the access node and a child access node of the access node, and responsive to the feedback request, transmits a feedback message indicating acceptance or rejection of the indicated slot format based at least in part on the impact on scheduling. This may allow the UE 115 to avoid conflicts between resources on communication links or utilize unused resources on a communication link. Thus, the resources may be efficiently used on multiple links. Further, based on the indicated slot format, a processor may be configured to efficiently use resources according to the indicated slot format or to maintain a current configuration based on a rejection of the indicated slot format. Thus, the processing resources may not be wasted by switching to another format.

One advantage of receiving the downlink signaling indicating that a resource previously indicated to be non-schedulable is now schedulable is that the UE 115 may utilize the resources to enhance a communication link, thus communicating more efficiently using more resources. Further, a processor of the UE 115 may turn on one or more processing units for communicating over the now schedulable resources, increase a processing clock, or a similar mechanism within the UE 115. As such, when the slot format indication is received, the processor may be ready to communicate more efficiently through the reduction of a ramp up in processing power.

One advantage of receiving the downlink signaling indicating availability of a parent-node controlled resource of a link configured between the parent access node and the access node is that the UE 115 may utilize the resources to enhance a communication link, thus communicating more efficiently using more resources. Further, a processor of the UE 115 may turn on one or more processing units for communicating over the now schedulable resources, increase a processing clock, or a similar mechanism within the UE 115. As such, when the slot format indication is received, the processor may be ready to communicate more efficiently through the reduction of a ramp up in processing power.

One advantage of transmitting a physical uplink control channel message or an uplink medium access control message indicating acceptance or rejection of the indicated slot format is that the UE 115 may either use the resources as indicated by the slot format or continue to use (or schedule) resources with the child node based on a rejection of the slot format. Further, a processor of the UE 115 may turn on one or more processing units for communicating using the resources indicated by the slot format, increase a processing clock, or a similar mechanism within the UE 115. As such, when the slot format indication is received, the processor may be ready to communicate more efficiently through the reduction of a ramp up in processing power. If the processor rejection the slot format, processing resources are not wasted switching to process the new format.

Another potential advantage is based on receiving a capability indicator from a second access node, determining a first resource pattern for a first link between the second access node and the first access node and determining a second resource pattern for a second link between the second access node and a child access node of the second access node based at least in part on the capability indicator, communicating via the first link in accordance with the first resource pattern, and transmitting an indicator of the second resource pattern to the second access node. This may allow a UE 115 to schedule resources for another UE 115 such that the resources are used efficiently and such that a UE is able to communicate according to its capability. Further, the processor of the UE 115 may be able to efficiently determine resource patterns for communications by another UE based on receipt of the indication. For example, a processor may turn on one or more processing units for determining resource patterns, increase a processing clock, or a similar mechanism within the UE 115. As such, when the capability indication is received, the processor may be ready to communicate more efficiently through the reduction of a ramp up in processing power.

One advantage of configuring the first resource pattern and the second resource pattern to support a time division multiplexing scheme between the first link and the second link based at least in part on the capability indicator indicating that the second access node has a half-duplex capability is that the UE 115 is able to allocate resources according to the half-duplex capability using time division multiplexing. Further, the processor of the second UE may be efficiently utilized to process time division multiplexed resources on a channel between a child node and between a parent node.

One advantage of configuring the first resource pattern and the second resource pattern to support a spatial division multiplexing scheme or a frequency division multiplexing scheme with uplink and downlink coordination between the first link and the second link based at least in part on the capability indicator indicating that the second access node has a half-duplex capability is that the UE 115 is able to allocate resources according to the half-duplex capability using spatial or frequency division multiplexing. Further, the processor of the second UE may be efficiently utilized to process spatial or frequency division multiplexed resources on a channel between a child node and between a parent node.

Figure 13:
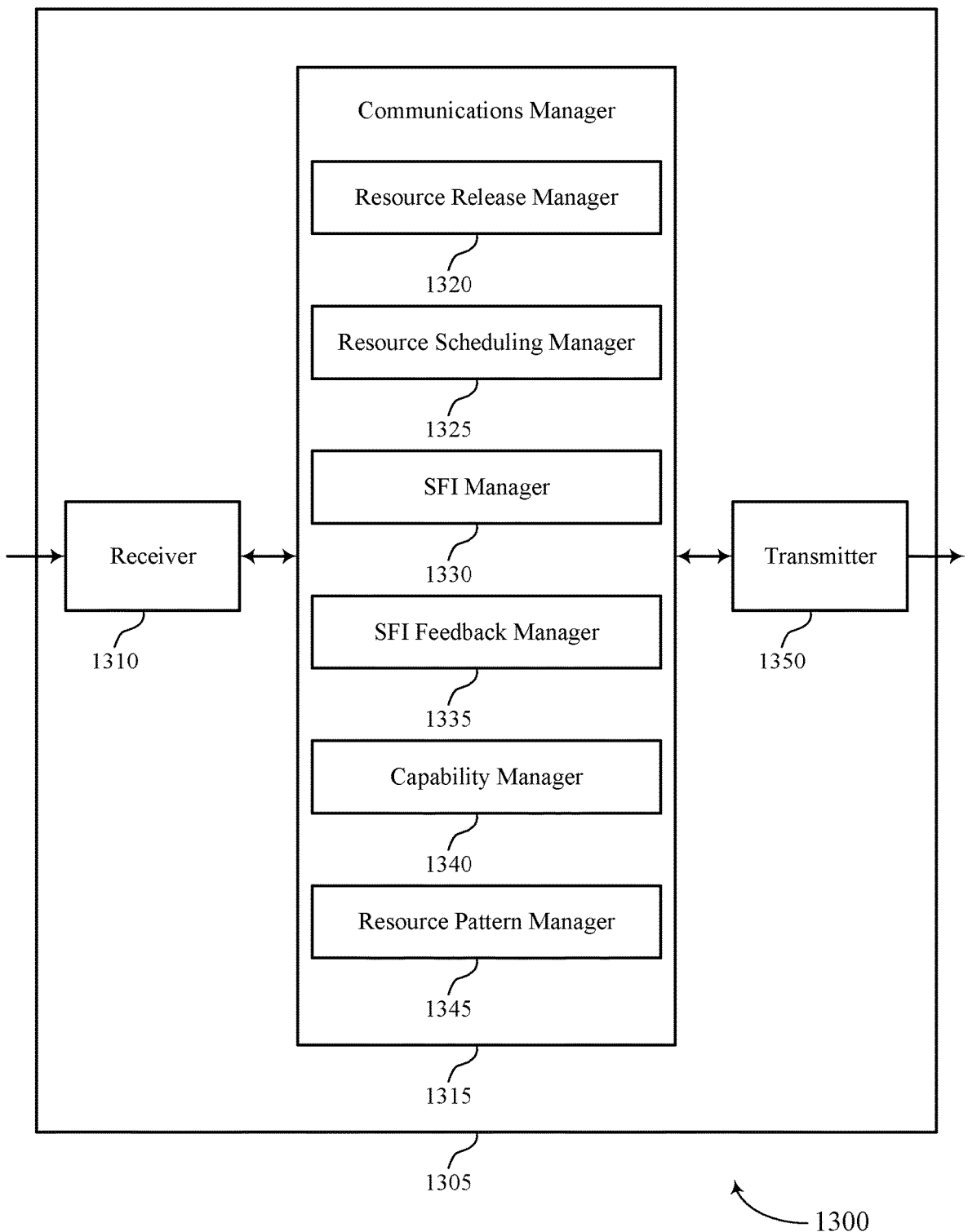

FIG. 13 shows a block diagram 1300 of a device 1305 that supports dynamic resource management in accordance with aspects of the present disclosure. The device 1305 may be an example of aspects of a device 1205, or an access node (e.g., a network device, IAB node, relay node, etc.) as described herein. The device 1305 may include a receiver 1310, a communications manager 1315, and a transmitter 1350. The device 1305 may also include a processor. Each of these components may be in communication with one another (e.g., via one or more buses).

The receiver 1310 may receive information such as packets, user data, or control information associated with various information channels (e.g., control channels, data channels, and information related to dynamic resource management, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a resource release manager 1320, a resource scheduling manager 1325, a SFI manager 1330, a SFI feedback manager 1335, a capability manager 1340, and a resource pattern manager 1345. The communications manager 1315 may be an example of aspects of the communications manager 1510 described herein.

The resource release manager 1320 may monitor for a downlink indication indicating a resource release of a parent node controlled resource, where the resource release indicates availability of the parent node controlled resource for a link configured between the access node and a child access node and monitor for an uplink indication indicating a resource release of a child access node controlled resource that is at least partially overlapping in time with the parent node controlled resource, where the resource release of the child access node controlled resource indicates availability of the child access node controlled resource for the link configured between the access node and the child access node. In some cases, the resource release manager 1320 may receive the uplink indication including a message including a bit, field, or flag indicating the child access node controlled resource. In some cases, the resource release manager 1320 may receive the downlink indication including a message including a bit, field, or flag indicating the parent node controlled resource including a bit, field, or flag indicating the parent node controlled resource.

The resource scheduling manager 1325 may schedule the parent node controlled resource for the link configured between the access node and the child access node based on reception of both the downlink indication and the uplink indication.

The SFI manager 1330 may receive, from a parent access node, downlink signaling indicating a slot format and a feedback request.

The resource scheduling manager 1325 may determine, based on the indicted slot format, an impact on scheduling for a link configured between the access node and a child access node of the access node.

The SFI feedback manager 1335 may transmit a feedback message indicating acceptance or rejection of the indicated slot format based on the feedback request.

The capability manager 1340 may receive a capability indicator from a second access node.

The resource pattern manager 1345 may determine a first resource pattern for a first link between the second access node and the access node and determine a second resource pattern for a second link between the second access node and a child access node of the second access node based on the capability indicator, communicate via the first link in accordance with the first resource pattern, and transmit an indicator of the second resource pattern to the second access node.

The transmitter 1350 may transmit signals generated by other components of the device 1305. In some examples, the transmitter 1350 may be collocated with a receiver 1310 in a transceiver module. For example, the transmitter 1350 may be an example of aspects of the transceiver 1520 described with reference to FIG. 15. The transmitter 1350 may utilize a single antenna or a set of antennas.

Figure 14:
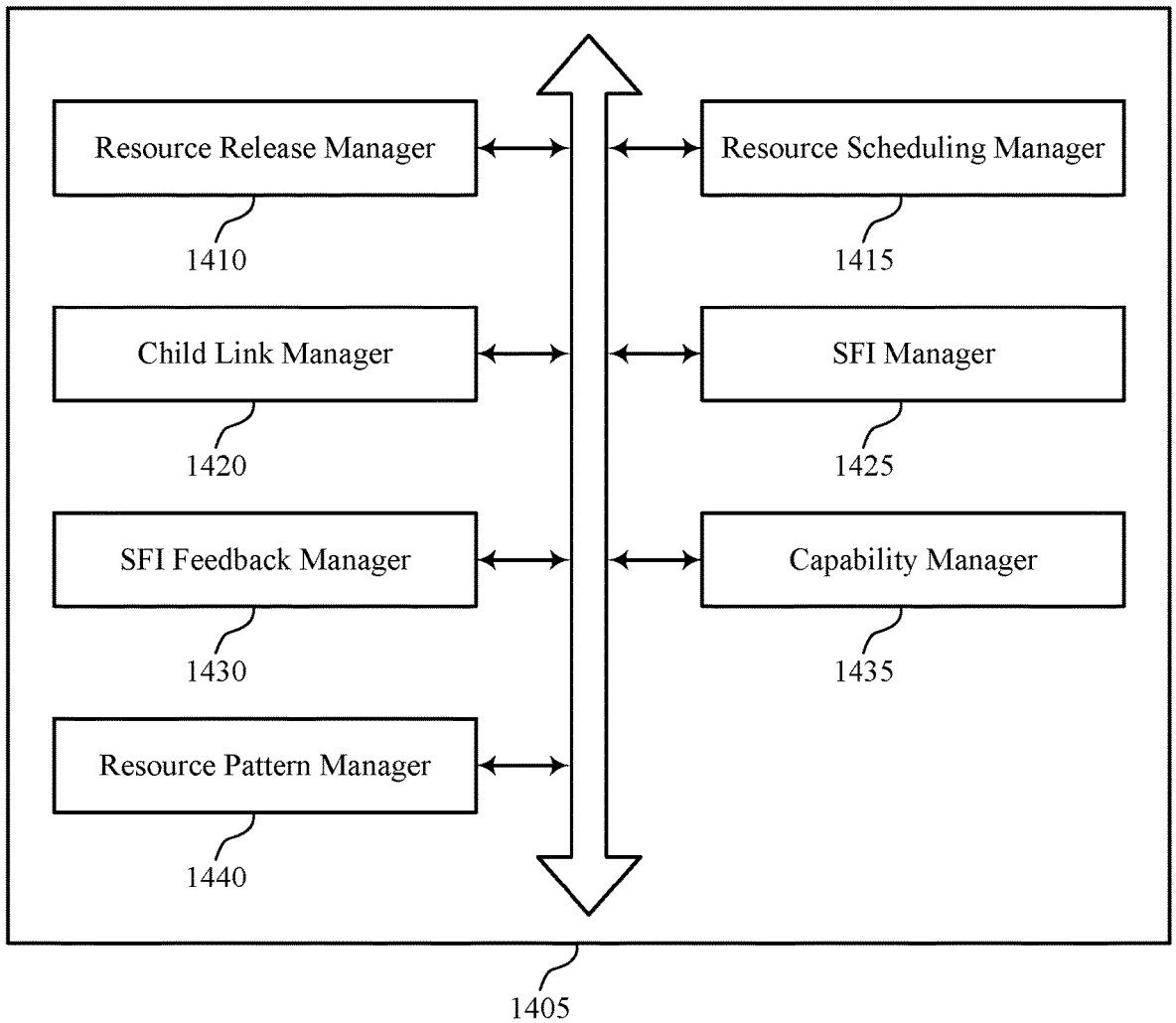
FIG. 14 shows a block diagram of a communications manager that supports dynamic resource management in accordance with aspects of the present disclosure.

FIG. 14 shows a block diagram 1400 of a communications manager 1405 that supports dynamic resource management in accordance with aspects of the present disclosure. The communications manager 1405 may be an example of aspects of a communications manager 1215, a communications manager 1315, or a communications manager 1510 described herein. The communications manager 1405 may include a resource release manager 1410, a resource scheduling manager 1415, a child link manager 1420, a SFI manager 1425, a SFI feedback manager 1430, a capability manager 1435, and a resource pattern manager 1440. Each of these modules may communicate, directly or indirectly, with one another (e.g., via one or more buses).

The resource release manager 1410 may monitor for a downlink indication indicating a resource release of a parent node controlled resource, where the resource release indicates availability of the parent node controlled resource for a link configured between the access node and a child access node. In some examples, the resource release manager 1410 may monitor for an uplink indication indicating a resource release of a child access node controlled resource that is at least partially overlapping in time with the parent node controlled resource, where the resource release of the child access node controlled resource indicates availability of the child access node controlled resource for the link configured between the access node and the child access node. In some examples, the resource release manager 1410 may monitor for a second downlink indication and a second uplink indication. In some examples, the resource release manager 1410 may determine that one or both of the second downlink indication and the second uplink indication have not been received, and not schedule the parent node controlled resource based on the determination that the one or both of the downlink indication and the uplink indication have not been received. In some examples, the resource release manager 1410 may receive both the downlink indication and the uplink indication, and schedule the parent node controlled resource based on the reception of both the downlink indication and the uplink indication. In some examples, the resource release manager 1410 may monitor for a physical downlink control channel message or a downlink medium access control message including the downlink indication.

In some examples, the resource release manager 1410 may monitor for a physical uplink control channel message or an uplink medium access control message including the uplink indication. In some examples, the resource release manager 1410 may determine whether the downlink indication is detected based on an on-off signaling scheme. In some examples, the resource release manager 1410 may determine whether the uplink indication is detected based on an on-off signaling scheme. In some examples, the resource release manager 1410 may monitor identify a multiplexing mode (e.g., where the multiplexing mode comprises a TDM mode, a SDM mode, or a FDM mode) and monitor for the downlink indication and the uplink indication based at least in part on the multiplexing mode. In some examples, the resource release manager 1410 may receive the downlink signaling indicating that a resource previously indicated to be non-schedulable is now schedulable. In some examples, the resource release manager 1410 may receive the downlink signaling indicating availability of a parent-node controlled resource of a link configured between the parent access node and the access node. In some cases, the resource release manager 1410 may receive the uplink indication including a message including a bit, field, or flag indicating the child access node controlled resource. In some cases, the resource release manager 1410 may receive the downlink indication including a message including a bit, field, or flag indicating the parent node controlled resource including a bit, field, or flag indicating the parent node controlled resource.

The resource scheduling manager 1415 may schedule the parent node controlled resource for the link configured between the access node and the child access node based on whether both the downlink indication and the uplink indication are received. In some examples, the resource scheduling manager 1415 may determine, based on a TTI format corresponding to the TTI format indicator, an impact on scheduling for a link configured between the access node and a child access node of the access node.

The SFI manager 1425 may receive, from a parent access node, downlink signaling indicating a slot format and a feedback request. In some cases, the feedback request is a field having a defined value indicated by the downlink signaling.

The SFI feedback manager 1430 may transmit a feedback message indicating acceptance or rejection of the indicated slot format based on the feedback request. In some examples, the SFI feedback manager 1430 may transmit a physical uplink control channel message or an uplink medium access control message indicating acceptance or rejection of the indicated slot format. In some examples, the SFI feedback manager 1430 may transmit the feedback message indicating acceptance or rejection of a portion of a set of one or more slots corresponding to the indicated slot format. In some examples, the SFI feedback manager 1430 may transmit the feedback message including a single bit indicating acceptance or rejection of the slot format. In some examples, the SFI feedback manager 1430 may transmit the feedback message indicating a request to use a parent-controlled resource of the link to accept the indicated slot format based at least in part on the impact on scheduling. In some examples, the SFI feedback manager 1430 may transmit the feedback message declining to use a parent-controlled resource of the link to reject the indicated slot format based at least in part on the impact on scheduling. In some examples, the SFI feedback manager 1430 may transmit the feedback message indicating that a child-controlled resource of the link is unscheduled to accept the indicated slot format based at least in part on the impact on scheduling. In some examples, the SFI feedback manager 1430 may transmit the feedback message indicating that a child-controlled resource of the link is scheduled to reject the indicated slot format based at least in part on the impact on scheduling.

The capability manager 1435 may receive a capability indicator from a second access node.

The resource pattern manager 1440 may determine a first resource pattern for a first link between the second access node and a parent access node of the second access node and a second resource pattern for a second link between the second access node and the access node based on the capability indicator. In some examples, the resource pattern manager 1440 may communicate via the first link in accordance with the first resource pattern. In some examples, the resource pattern manager 1440 may transmit an indicator of the second resource pattern to the second access node. In some examples, the resource pattern manager 1440 may configure the first resource pattern and the second resource pattern to support a time division multiplexing scheme between the first link and the second link based on the capability indicator indicating that the second access node has a half-duplex capability. In some examples, the resource pattern manager 1440 may configure the first resource pattern and the second resource pattern to support a spatial division multiplexing scheme or a frequency division multiplexing scheme with uplink and downlink coordination between the first link and the second link based on the capability indicator indicating that the second access node has a half-duplex capability.

In some examples, the resource pattern manager 1440 may configure the first resource pattern and the second resource pattern to coordinate a transmit state and receive state for the first and second links. In some examples, the resource pattern manager 1440 may configure the first resource pattern and the second resource pattern to configure the second access node to simultaneously be in a transmit state for the first and second links. In some examples, the resource pattern manager 1440 may configure the first resource pattern and the second resource pattern to configure the second access node to simultaneously be in a receive state for the first and second links. In some cases, the first access node is the parent access node of the second access node. In some cases, the first node is a central unit. The child link manager 1420 may schedule a transmission with the child access node via the parent node controlled resource. In some examples, the child link manager 1420 may transmit or receive the transmission via the parent node controlled resource of the link based on the scheduling.

Figure 15:
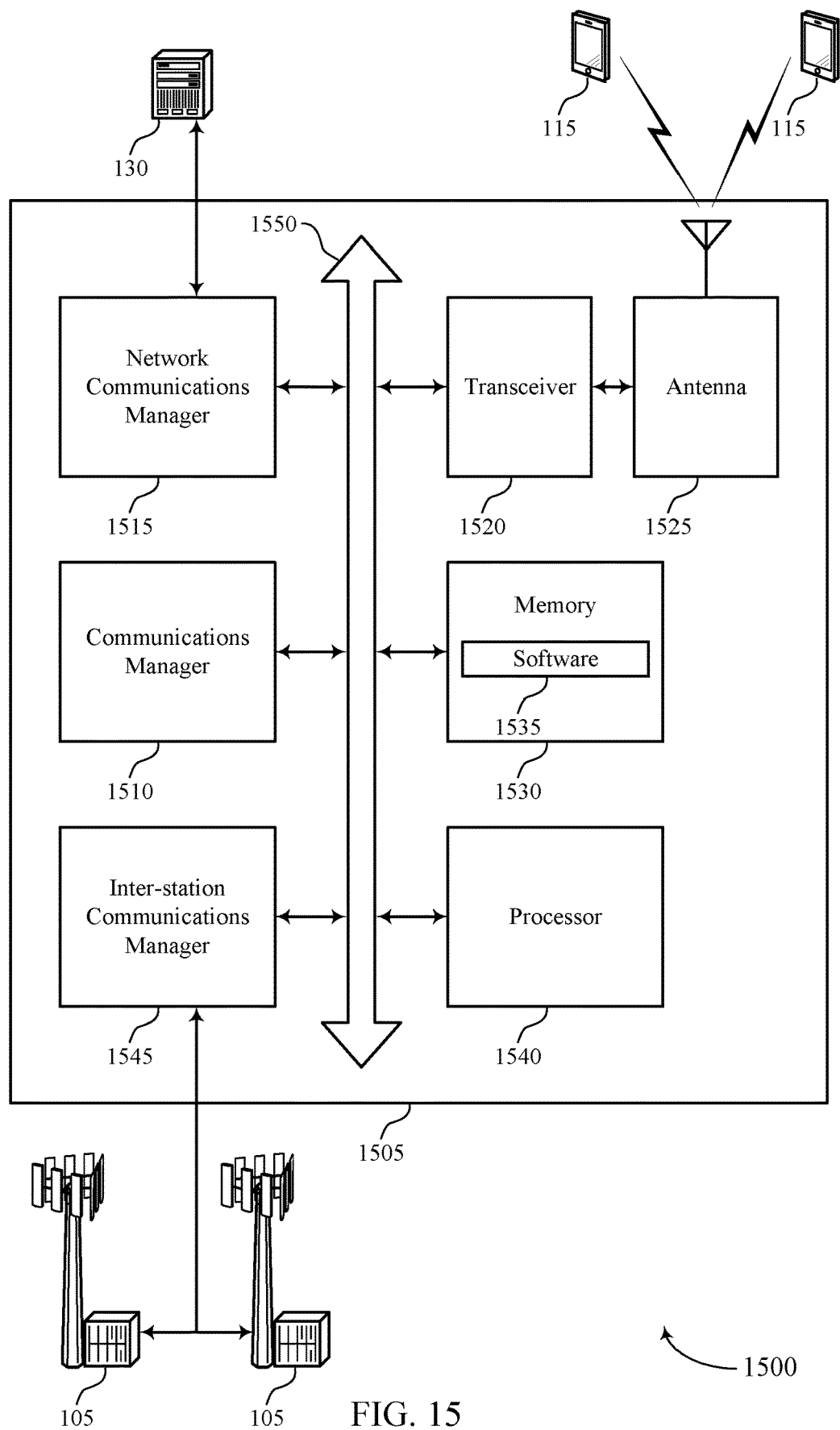
FIG. 15 shows a diagram of a system including a device that supports dynamic resource management in accordance with aspects of the present disclosure.

FIG. 15 shows a diagram of a system 1500 including a device 1505 that supports dynamic resource management in accordance with aspects of the present disclosure. The device 1505 may be an example of or include the components of device 1205, device 1305, or an access node (e.g., a network device, IAB node, relay node, etc.) as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may monitor for a downlink indication indicating a resource release of a parent node controlled resource, where the resource release indicates availability of the parent node controlled resource for a link configured between the access node and a child access node, monitor for an uplink indication indicating a resource release of a child access node controlled resource that is at least partially overlapping in time with the parent node controlled resource, where the resource release of the child access node controlled resource indicates availability of the child access node controlled resource for the link configured between the access node and the child access node, and schedule the parent node controlled resource for the link configured between the access node and the child access node based on reception of both the downlink indication and the uplink indication. The communications manager 1510 may also receive, from a parent access node, downlink signaling indicating a slot format and a feedback request, determine, based on the indicates slot format, an impact on scheduling for a link configured between the access node and a child access node of the access node, and transmit a feedback message indicating acceptance or rejection of the indicated slot format based on the feedback request. The communications manager 1510 may also receive a capability indicator from a second access node, determine a first resource pattern for a first link between the second access node and the access node and determine a second resource pattern for a second link between the second access node and a child access node of the second access node based on the capability indicator, communicate via the first link in accordance with the first resource pattern, and transmit an indicator of the second resource pattern to the second access node. The communications manager 1510 may be implemented with any combination of processor 1540, memory 1530, software 1535, and transceiver 1520, as well as with any other of the described components, to perform the various techniques described herein.

The network communications manager 1515 may manage communications with the core network (e.g., via one or more wired backhaul links). For example, the network communications manager 1515 may manage the transfer of data communications for client devices, such as one or more UEs 115. The network communications manager 1515 may be implemented with any combination of processor 1540, memory 1530, and software 1535 as well as with any other of the described components, to perform the various techniques described herein.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code or software 1535 including instructions that, when executed by a processor (e.g., the processor 1540) cause the device to perform various functions described herein. In some cases, the memory 1530 may contain, among other things, a basic input/output system (BIOS) which may control basic hardware or software operation such as the interaction with peripheral components or devices.

The processor 1540 may include an intelligent hardware device, (e.g., a general-purpose processor, a digital signal processor (DSP), a CPU, a microcontroller, an ASIC, an field programmable gate array (FPGA), a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting dynamic resource management).

The inter-station communications manager 1545 may manage communications with other access nodes, and may include a controller or scheduler for controlling communications with child nodes in cooperation with other access nodes. For example, the inter-station communications manager 1545 may coordinate scheduling for transmissions to child nodes for various interference mitigation techniques such as beamforming or joint transmission. In some examples, the inter-station communications manager 1545 may provide an X2 interface within an LTE/LTE-A wireless communication network technology to provide communication between base stations 105. The inter-station manager may be implemented with any combination of processor 1540, memory 1530, software 1535, and transceiver 1520, as well as with any other of the described components, to perform the various techniques described herein.

The software 1535 may include instructions to implement aspects of the present disclosure, including instructions to support wireless communications. The software 1535 may be stored in a non-transitory computer-readable medium such as system memory or other type of memory. In some cases, the software 1535 may not be directly executable by the processor 1540 but may cause a computer (e.g., when compiled and executed) to perform functions described herein.

Figure 16:
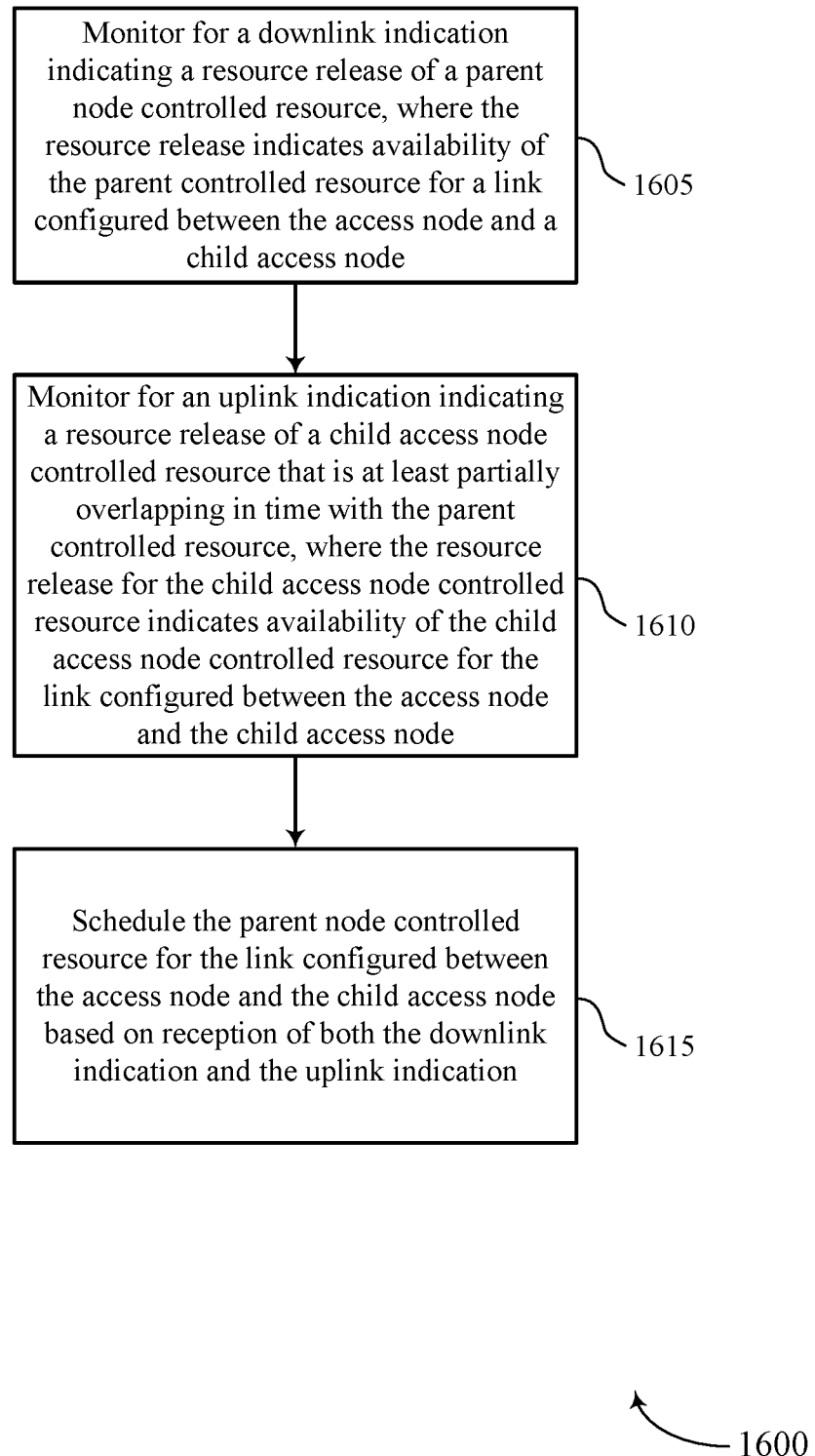
FIGS. 16 through 18 show flowcharts illustrating methods that support dynamic resource management in accordance with aspects of the present disclosure.

FIG. 16 shows a flowchart illustrating a method 1600 that supports dynamic resource management in accordance with aspects of the present disclosure. The operations of method 1600 may be implemented by an access node (e.g., a network device, IAB node, relay node, etc.) or its components as described herein. For example, the operations of method 1600 may be performed by a communications manager as described with reference to FIGS. 12 through 15. In some examples, an access node may execute a set of instructions to control the functional elements of the access node to perform the functions described below. Additionally or alternatively, an access node may perform aspects of the functions described below using special-purpose hardware.

At 1605, the access node may monitor for a downlink indication indicating a resource release of a parent node controlled resource, where the resource release indicates availability of the parent node controlled resource for a link configured between the access node and a child access node. The operations of 1605 may be performed according to the methods described herein. In some examples, aspects of the operations of 1605 may be performed by a resource release manager as described with reference to FIGS. 12 through 15.

At 1610, the access node may monitor for an uplink indication indicating a resource release of a child access node controlled resource that is at least partially overlapping in time with the parent node controlled resource, where the resource release for the child access node controlled resource indicates availability of the child access node controlled resource for the link configured between the access node and the child access node. The operations of 1610 may be performed according to the methods described herein. In some examples, aspects of the operations of 1610 may be performed by a resource release manager as described with reference to FIGS. 12 through 15.

At 1615, the access node may schedule the parent node controlled resource for the link configured between the access node and the child access node based on reception of both the downlink indication and the uplink indication. The operations of 1615 may be performed according to the methods described herein. In some examples, aspects of the operations of 1615 may be performed by a resource scheduling manager as described with reference to FIGS. 12 through 15.

Figure 17:
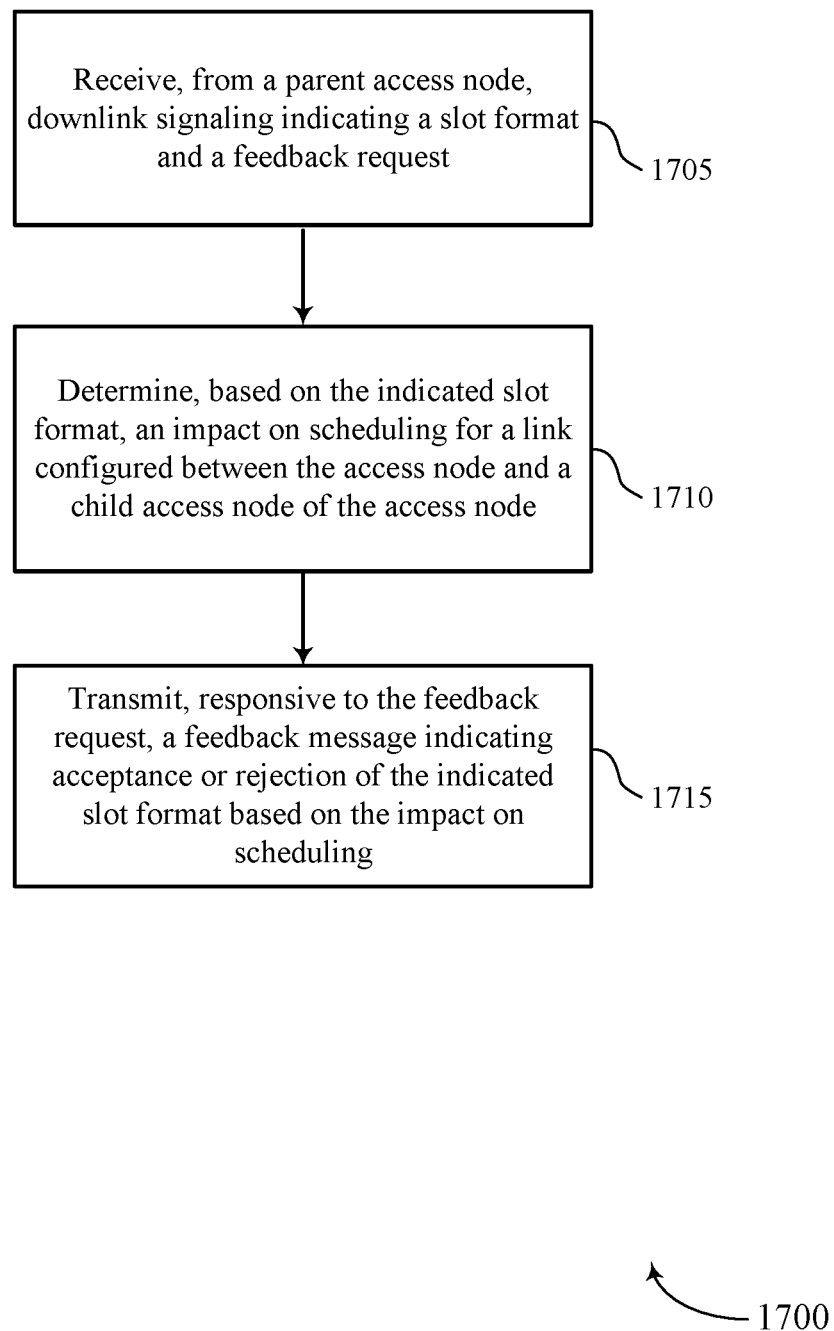

FIG. 17 shows a flowchart illustrating a method 1700 that supports dynamic resource management in accordance with aspects of the present disclosure. The operations of method 1700 may be implemented by an access node (e.g., a network device, IAB node, relay node, etc.) or its components as described herein. For example, the operations of method 1700 may be performed by a communications manager as described with reference to FIGS. 12 through 15. In some examples, a access node may execute a set of instructions to control the functional elements of the access node to perform the functions described below. Additionally or alternatively, a access node may perform aspects of the functions described below using special-purpose hardware.

At 1705, the access node may receive, from a parent access node, downlink signaling indicating a slot format and a feedback request. The operations of 1705 may be performed according to the methods described herein. In some examples, aspects of the operations of 1705 may be performed by a SFI manager as described with reference to FIGS. 12 through 15.

At 1710, the access node may determine, based on the indicated slot, an impact on scheduling for a link configured between the access node and a child access node of the access node. The operations of 1710 may be performed according to the methods described herein. In some examples, aspects of the operations of 1710 may be performed by a resource scheduling manager as described with reference to FIGS. 12 through 15.

At 1715, the access node may transmit a feedback message indicating acceptance or rejection of the indicated slot format responsive to the feedback request. The operations of 1715 may be performed according to the methods described herein. In some examples, aspects of the operations of 1715 may be performed by a SFI feedback manager as described with reference to FIGS. 12 through 15.

Figure 18:
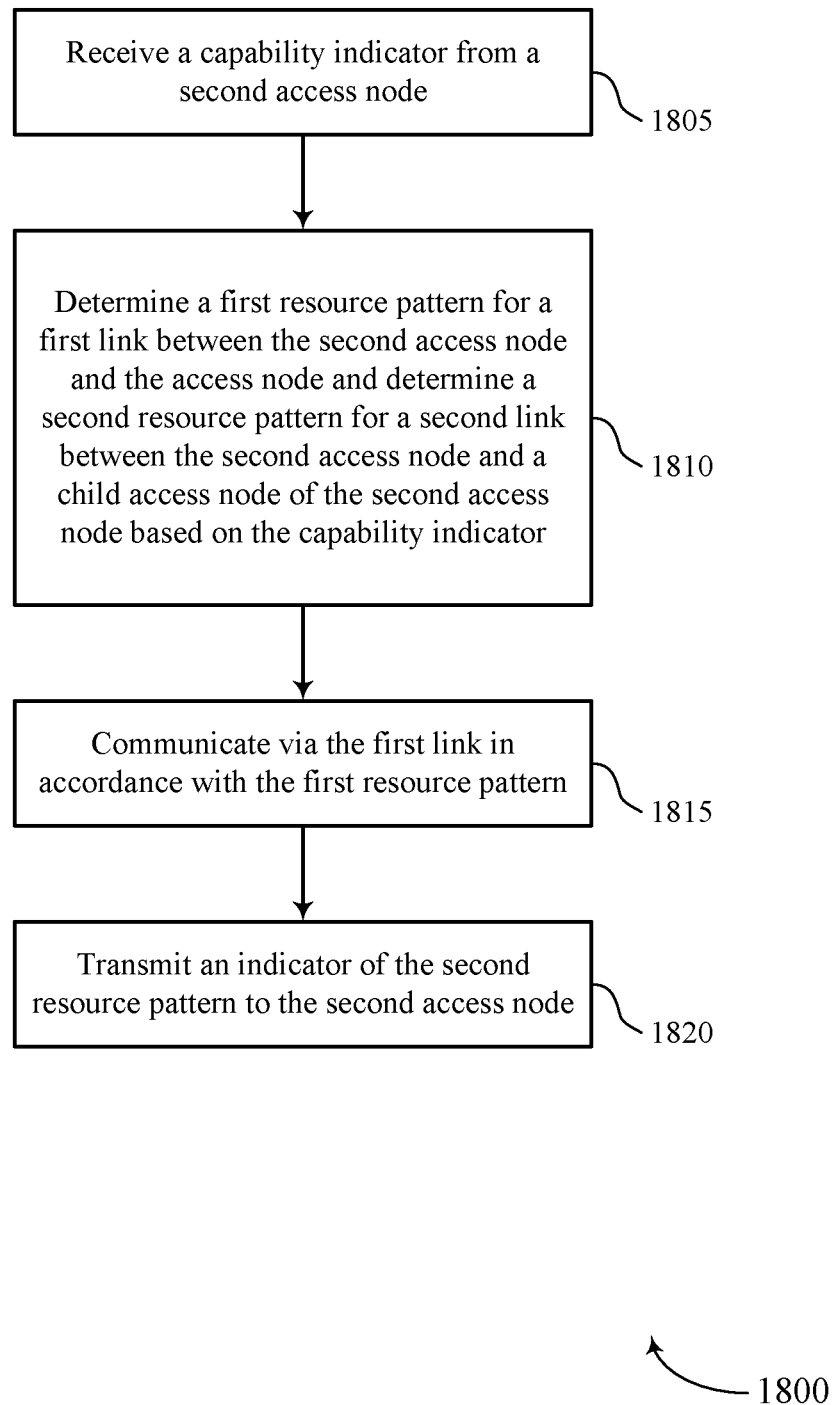

FIG. 18 shows a flowchart illustrating a method 1800 that supports dynamic resource management in accordance with aspects of the present disclosure. The operations of method 1800 may be implemented by an access node (e.g., a network device, IAB node, relay node, etc.) or its components as described herein. For example, the operations of method 1800 may be performed by a communications manager as described with reference to FIGS. 12 through 15. In some examples, a access node may execute a set of instructions to control the functional elements of the access node to perform the functions described below. Additionally or alternatively, a access node may perform aspects of the functions described below using special-purpose hardware.

At 1805, the access node may receive a capability indicator from a second access node. The operations of 1805 may be performed according to the methods described herein. In some examples, aspects of the operations of 1805 may be performed by a capability manager as described with reference to FIGS. 12 through 15.

At 1810, the access node may determine a first resource pattern for a first link between the second access node and the access node and determine a second resource pattern for a second link between the second access node and a child access node of the second access node based on the capability indicator. The operations of 1810 may be performed according to the methods described herein. In some examples, aspects of the operations of 1810 may be performed by a resource pattern manager as described with reference to FIGS. 12 through 15.

At 1815, the access node may communicate via the first link in accordance with the first resource pattern. The operations of 1815 may be performed according to the methods described herein. In some examples, aspects of the operations of 1815 may be performed by a resource pattern manager as described with reference to FIGS. 12 through 15.

At 1820, the access node may transmit an indicator of the second resource pattern to the second access node. The operations of 1820 may be performed according to the methods described herein. In some examples, aspects of the operations of 1820 may be performed by a resource pattern manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC- FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a central unit, comprising:
   receiving, at the central unit from an access node, a duplexing capability indicator indicating that the access node has a full-duplex capability;
   determining, by the central unit, a first resource pattern for a parent link between the access node and a parent access node of the access node and determining a second resource pattern for a child link between the access node and a child access node of the access node, wherein the first resource pattern and the second resource pattern are based at least in part on the duplexing capability indicator indicating that the access node has the full-duplex capability, and wherein the first resource pattern and the second resource pattern are indicative of whether the access node is to use a frequency division multiplexing scheme or a time division multiplexing scheme over a set of time domain resources that is to be used by the access node for communications on the parent link and the child link; and
   transmitting an indicator of the second resource pattern.

2. The method of claim 1, wherein transmitting the indicator of the second resource pattern comprises:
   transmitting the indicator of the second resource pattern to the access node.

3. The method of claim 1, further comprising:
   transmitting the indicator of the first resource pattern to the access node.

4. The method of claim 1, wherein the duplexing capability indicator is capable of indicating the full-duplex capability or a half-duplex capability.

5. The method of claim 1, wherein receiving the duplexing capability indicator comprises:
   receiving, from the access node, a control message that includes the duplexing capability indicator.

6. The method of claim 1, wherein the first resource pattern, the second resource pattern, or both indicate that the access node is to simultaneously transmit and receive during a resource of the set of time domain resources based at least in part on the duplexing capability indicator indicating that the access node has the full-duplex capability.

7. A central unit for wireless communication, comprising:
   a processor,
   memory in electronic communication with the processor; and
   instructions stored in the memory and executable by the processor to cause the central unit to:
      receive, at the central unit and from an access node, a duplexing capability indicator indicating that the access node has a full-duplex capability;
      determine, by the central unit, a first resource pattern for a parent link between the access node and a parent access node of the access node and determine a second resource pattern for a child link between the access node and a child access node of the access node, wherein the first resource pattern and the second resource pattern are based at least in part on the duplexing capability indicator indicating that the access node has the full-duplex capability, and wherein the first resource pattern and the second resource pattern are indicative of whether the access node is to use a frequency division multiplexing scheme or a time division multiplexing scheme over a set of time domain resources that is to be used by the access node for communications on the parent link and the child link; and
      transmit an indicator of the second resource pattern.

8. The central unit of claim 7, wherein the instructions to transmit the indicator of the second resource pattern are further executable by the processor to cause the central unit to:
   transmit the indicator of the second resource pattern to the access node.

9. The central unit of claim 7, wherein the instructions are further executable by the processor to cause the central unit to:
   transmit the indicator of the first resource pattern to the access node.

10. The central unit of claim 7, wherein the duplexing capability indicator is capable of indicating the full-duplex capability or a half-duplex capability and wherein the instructions are further executable by the processor to cause the central unit to:
    configure the first resource pattern and the second resource pattern to support the time division multiplexing scheme between the parent link and the child link based at least in part on the duplexing capability indicator indicating that the access node has the half-duplex capability.

11. The central unit of claim 7, wherein the duplexing capability indicator is capable of indicating the full-duplex capability or a half-duplex capability and wherein the instructions are further executable by the processor to cause the central unit to:
configure the first resource pattern and the second resource pattern to support a spatial division multiplexing scheme or the frequency division multiplexing scheme with uplink and downlink coordination between the parent link and the child link based at least in part on the duplexing capability indicator indicating that the access node has the half-duplex capability.

12. The central unit of claim 11, wherein the instructions to configure the first resource pattern and the second resource pattern are executable by the processor to cause the central unit to:
configure the first resource pattern and the second resource pattern to coordinate a transmit state and receive state for the parent and child links.

13. The central unit of claim 12, wherein the instructions to configure the first resource pattern and the second resource pattern further are executable by the processor to cause the central unit to:
configure the first resource pattern and the second resource pattern to configure the access node to simultaneously be in a transmit state for the parent and child links.

14. The central unit of claim 12, wherein the instructions to configure the first resource pattern and the second resource pattern further are executable by the processor to cause the central unit to:
configure the first resource pattern and the second resource pattern to configure the access node to simultaneously be in a receive state for the parent and child links.

15. The central unit of claim 7, wherein the first resource pattern, the second resource pattern, or both indicate that the access node is to simultaneously transmit and receive during a resource of the set of time domain resources based at least in part on the duplexing capability indicator indicating that the access node has the full-duplex capability.

16. A central unit for wireless communication, comprising:
means for receiving, at the central unit from an access node, a duplexing capability indicator indicating that the access node has a full-duplex capability;
means for determining, by the central unit, a first resource pattern for a parent link between the access node and a parent access node of the access node and determining a second resource pattern for a child link between the access node and a child access node of the access node, wherein the first resource pattern and the second resource pattern are based at least in part on the duplexing capability indicator indicating that the access node has the full-duplex capability, and wherein the first resource pattern and the second resource pattern are indicative of whether the access node is to use a frequency division multiplexing scheme or a time division multiplexing scheme over a set of time domain resources that is to be used by the access node for communications on the parent link and the child link; and
means for transmitting an indicator of the second resource pattern.

17. The central unit of claim 16, wherein the means for transmitting the indicator of the second resource pattern further comprise:
means for transmitting the indicator of the second resource pattern to the access node.

18. The central unit of claim 16, further comprising:
means for transmitting the indicator of the first resource pattern to the access node.

19. The central unit of claim 16, wherein the duplexing capability indicator is capable of indicating the full-duplex capability or a half-duplex capability, further comprising:
means for configuring the first resource pattern and the second resource pattern to support the time division multiplexing scheme between the parent link and the child link based at least in part on the duplexing capability indicator indicating that the access node has the half-duplex capability.

20. The central unit of claim 16, wherein the duplexing capability indicator is capable of indicating the full-duplex capability or a half-duplex capability, further comprising:
means for configuring the first resource pattern and the second resource pattern to support a spatial division multiplexing scheme or the frequency division multiplexing scheme with uplink and downlink coordination between the parent link and the child link based at least in part on the duplexing capability indicator indicating that the access node has the half-duplex capability.

21. The central unit of claim 20, wherein the means for configuring the first resource pattern and the second resource pattern comprises:
means for configuring the first resource pattern and the second resource pattern to coordinate a transmit state and receive state for the parent and child links.

22. The central unit of claim 21, wherein the means for configuring the first resource pattern and the second resource pattern further comprises:
means for configuring the first resource pattern and the second resource pattern to configure the access node to simultaneously be in a transmit state for the parent and child links.

23. The central unit of claim 21, wherein the means for configuring the first resource pattern and the second resource pattern further comprises:
means for configuring the first resource pattern and the second resource pattern to configure the access node to simultaneously be in a receive state for the parent and child links.

24. The central unit of claim 16, wherein the first resource pattern, the second resource pattern, or both indicate that the access node is to simultaneously transmit and receive during a resource of the set of time domain resources based at least in part on the duplexing capability indicator indicating that the access node has the full-duplex capability.

25. A non-transitory computer-readable medium storing code for wireless communication, the code comprising instructions executable by a processor to:
receive, at a central unit from an access node, a duplexing capability indicator indicating that the access node has a full-duplex capability;
determine, by the central unit, a first resource pattern for a parent link between the access node and a parent access node of the access node and determine a second resource pattern for a child link between the access node and a child access node of the access node, wherein the first resource pattern and the second resource pattern are based at least in part on the duplexing capability indicator indicating that the access node has the full-duplex capability, and wherein the first resource pattern and the second resource pattern are indicative of whether the access node is to use a frequency division multiplexing scheme or a time division multiplexing scheme over a set of time domain resources that is to be used by the access node for communications on the parent link and the child link; and transmit an indicator of the second resource pattern.

26. The non-transitory computer-readable medium of claim 25, wherein the instructions to transmit the indicator of the second resource pattern are further executable to:
   transmit the indicator of the second resource pattern to the access node.

27. The non-transitory computer-readable medium of claim 25, wherein the instructions are further executable to:
   transmit the indicator of the first resource pattern to the access node.

28. The non-transitory computer-readable medium of claim 25, wherein the duplexing capability indicator is capable of indicating the full-duplex capability or a half-duplex capability and wherein the instructions are further executable to:
   configure the first resource pattern and the second resource pattern to support the time division multiplexing scheme between the parent link and the child link based at least in part on the duplexing capability indicator indicating that the access node has the half-duplex capability.

29. The non-transitory computer-readable medium of claim 25, wherein the duplexing capability indicator is capable of indicating the full-duplex capability or a half-duplex capability and wherein the instructions are further executable to:
   configure the first resource pattern and the second resource pattern to support a spatial division multiplexing scheme or the frequency division multiplexing scheme with uplink and downlink coordination between the parent link and the child link based at least in part on the duplexing capability indicator indicating that the access node has the half-duplex capability.

30. The non-transitory computer-readable medium of claim 29, wherein the instructions to configure the first resource pattern and the second resource pattern are executable to:
   configure the first resource pattern and the second resource pattern to coordinate a transmit state and receive state for the parent and child links.

31. The non-transitory computer-readable medium of claim 30, wherein the instructions to configure the first resource pattern and the second resource pattern further are executable to:
   configure the first resource pattern and the second resource pattern to configure the access node to simultaneously be in a transmit state for the parent and child links.

32. The non-transitory computer-readable medium of claim 30, wherein the instructions to configure the first resource pattern and the second resource pattern further are executable to:
   configure the first resource pattern and the second resource pattern to configure the access node to simultaneously be in a receive state for the parent and child links.

33. The non-transitory computer-readable medium of claim 25, wherein the first resource pattern, the second resource pattern, or both indicate that the access node is to simultaneously transmit and receive during a resource of the set of time domain resources based at least in part on the duplexing capability indicator indicating that the access node has the full-duplex capability.

* * * * *